United States Patent
Fogle, Jr. et al.

(10) Patent No.: US 7,240,917 B2
(45) Date of Patent: Jul. 10, 2007

(54) ACTUATABLE FASTENER

(75) Inventors: Homer W. Fogle, Jr., Mesa, AZ (US);
Eric R. Mcfarland, Mesa, AZ (US);
Robert R. Debbs, Yale, MI (US);
Craig M. Fischer, Chandler, AZ (US);
John P. O'Loughlin, Gilbert, AZ (US);
Halley O. Stevens, Mesa, AZ (US);
Keven D. Thomas, Mesa, AZ (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 211 days.

(21) Appl. No.: 10/662,852

(22) Filed: Sep. 15, 2003

(65) Prior Publication Data

US 2005/0057027 A1   Mar. 17, 2005

(51) Int. Cl.
*B60R 21/30* (2006.01)
(52) U.S. Cl. .................. 280/739; 280/743.2; 411/20
(58) Field of Classification Search ............... 280/739, 280/738, 742, 743.2; 411/391, 19, 20, 390
See application file for complete search history.

(56) References Cited

U.S. PATENT DOCUMENTS

| | | | | |
|---|---|---|---|---|
| 2,653,504 | A | * | 9/1953 | Smith ..................... 411/391 |
| 3,084,597 | A | | 4/1963 | Beyer |
| 3,087,369 | A | * | 4/1963 | Butterfield .............. 411/391 |
| 3,352,189 | A | | 11/1967 | Brown |
| 3,374,702 | A | * | 3/1968 | Menichelli .............. 411/391 |
| 3,449,996 | A | | 6/1969 | Takahashi |
| 3,530,759 | A | | 9/1970 | Francis |
| 3,675,533 | A | | 7/1972 | Gawlick et al. |
| 4,671,715 | A | | 6/1987 | Berg |
| 4,986,708 | A | | 1/1991 | Moore et al. |
| 6,007,043 | A | | 12/1999 | Sperber et al. |
| 6,082,765 | A | * | 7/2000 | Bowers et al. ............ 280/742 |
| 6,125,526 | A | * | 10/2000 | Wierzchon .............. 29/525.02 |
| 6,409,213 | B2 | * | 6/2002 | Webber et al. ........... 280/739 |

(Continued)

FOREIGN PATENT DOCUMENTS

DE      19756977      7/1999

(Continued)

*Primary Examiner*—Paul N. Dickson
*Assistant Examiner*—Drew J. Brown
(74) *Attorney, Agent, or Firm*—Tarolli, Sundheim, Covell & Tummino LLP

(57) ABSTRACT

An actuatable fastener (50) includes a body (80) including a head (82) and a shank (84). The body (80) includes an interior chamber (120) partially defined by a side wall (132) extending from the head (82) into the shank (84) and an end wall (138) positioned in the shank. A member (140) is disposed in the chamber (120). An initiator (160) is actuatable to produce combustion products in the chamber (120) that act on the member (140) to move the member in a first direction in the chamber to strike the end wall (138). The member (140) strikes the end wall (138) creating a fracture (222) in the shank (84) separating at least a portion of the shank from a remainder (220) of the shank. The combustion products moving the member (150) beyond the fracture (222) at least a predetermined distance (226) to move the portion of the shank (84) at least the predetermined distance from the remainder (220) of the shank.

28 Claims, 11 Drawing Sheets

U.S. PATENT DOCUMENTS

| | | | |
|---|---|---|---|
| 6,616,184 B2* | 9/2003 | Fischer | 280/743.2 |
| 6,746,044 B2* | 6/2004 | Elqadah et al. | 280/736 |
| 6,749,217 B2* | 6/2004 | Damian et al. | 280/734 |
| 7,021,656 B2* | 4/2006 | Okamoto et al. | 280/739 |
| 2001/0038201 A1* | 11/2001 | Ryan | 280/742 |
| 2004/0232675 A1* | 11/2004 | Marotzke | 280/739 |

FOREIGN PATENT DOCUMENTS

| | | |
|---|---|---|
| DE | 10162229 | 9/2002 |
| DE | 10215787 | 12/2002 |
| DE | 10244220 | 6/2003 |
| DE | 10256436 | 7/2003 |
| DE | 10300156 | 8/2003 |

* cited by examiner

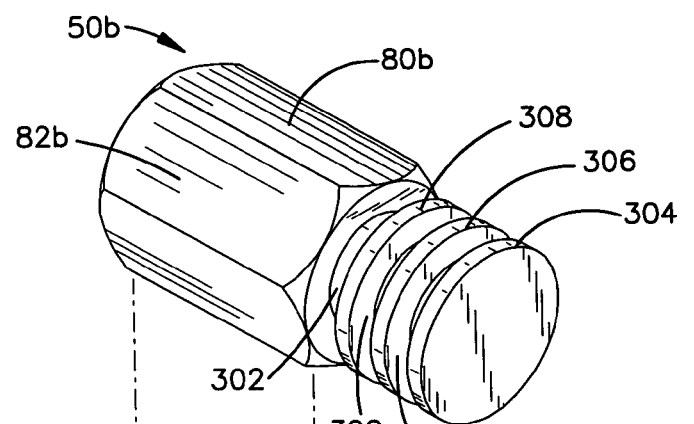
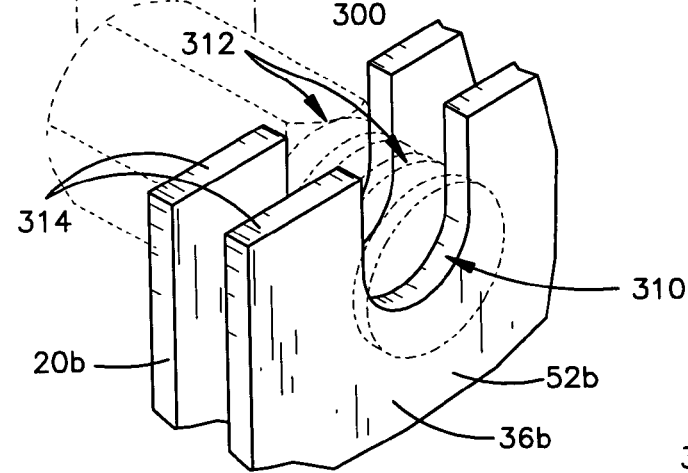
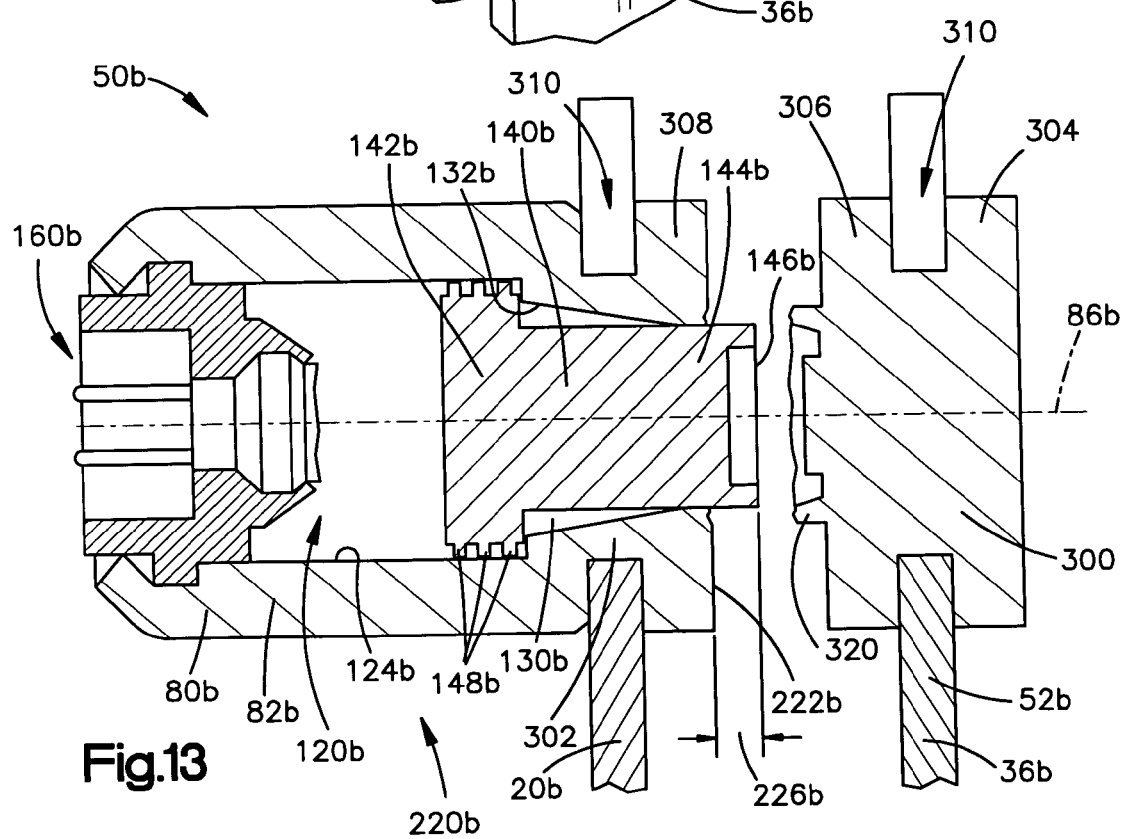

ACTUATABLE FASTENER

FIELD OF THE INVENTION

The present invention relates to an actuatable fastener. In one embodiment, the present invention relates to an actuatable fastener for use in an air bag module.

BACKGROUND OF THE INVENTION

It is known to provide an air bag module including a vent for venting inflation fluid from the module. The air bag includes a vent cover that is actuatable from a closed position covering the vent to an open position uncovering the vent. Upon actuation, the vent cover moves to the open position to vent inflation fluid from the air bag module.

It is also known to provide an air bag module with a tether for limiting an air bag from reaching a fully deployed position. The tether is connected to the air bag module by means actuatable to release the tether. Upon actuation, the tether is released, which allows the air bag to inflate to the fully deployed position.

SUMMARY OF THE INVENTION

The present invention relates to an actuatable fastener that includes a body having a head and a shank. The body has an interior chamber partially defined by a side wall extending from the head into the shank, and an end wall positioned in the shank. A member is disposed in the chamber. An initiator is actuatable to produce combustion products in the chamber that act on the member to move the member in a first direction in the chamber to strike with the end wall. The member, upon striking the end wall, creates a fracture in the shank that separates at least a portion of the shank from a remainder of the shank. The combustion products move the member beyond the fracture at least a predetermined distance to move the portion of the shank at least the predetermined distance from the remainder of the shank.

The present invention also relates to an actuatable fastener that includes a body having a head and a shank. The shank includes a first shank portion and a second shank portion. An initiator is at least partially supported in the body and is actuatable to rupture the shank and separate the first shank portion from the second shank portion. The first shank portion has an outer surface including first screw threads and the second shank portion has an outer surface including second screw threads. One of the first and second screw threads are right hand threads and the other of the first and second screw threads are left hand threads.

The present invention also relates to an actuatable fastener that includes a body having a head and a shank. The body has a hollow interior chamber extending from the head into the shank. A member is disposed in the chamber and slidable in the chamber. An initiator is at least partially supported in the head. The initiator is actuatable to produce combustion products in the chamber that act on the member to move the member in the chamber. The member, when moved in the chamber, acts on the shank to rupture the shank. The member includes at least one annular ring projecting from an annular outer surface of the member. The at least one ring engages a side wall of the chamber and provides a seal for helping to block the combustion products from escaping the chamber when the initiator is actuated.

The present invention also relates to an actuatable fastener that includes a body having a head and a shank. The body has a hollow interior chamber that extends from the head into the shank. A member is disposed in the chamber and is slidable in the chamber along an axis. An initiator is at least partially supported in the head. The initiator is actuatable to produce combustion products in the chamber that act on the member to move the member in the chamber. The member when moved in the chamber acts on the shank to rupture the shank. A spring is positioned in the chamber and engages the member. The spring biases the member against movement in the chamber to prevent the member from rattling in the chamber prior to actuation of the initiator.

The present invention also relates to an apparatus for helping to protect a vehicle occupant. The apparatus includes an inflatable vehicle occupant protection device having a deflated condition and an inflated condition. An inflation fluid source is actuatable to provide inflation fluid to inflate the protection device from the deflated condition to the inflated condition. A housing helps direct inflation fluid from the inflation fluid source toward the protection device upon actuation of the inflation fluid source. The housing includes a vent opening for venting inflation fluid from the housing. A vent member is movable a predetermined distance from a closed position blocking venting of inflation fluid through the vent opening to an open position enabling venting of inflation fluid through the vent opening. An actuatable fastener has a shank with a first portion connectable with the vent member and a second portion connectable with the housing to hold the vent member in the closed position. The actuatable fastener is actuatable to fracture the shank and release the vent member for movement toward the open position. The actuatable fastener also includes means for displacing the first portion the predetermined distance from the second portion to propel the vent member the predetermined distance from the closed position to the open position.

The present invention further relates to an actuatable fastener that includes a body having a head and a shank and a member disposed in the body. An initiator is connected with the head and is actuatable to produce combustion products that act on the member to urge the member against a surface in the shank. The member when moved against the surface creates a fracture in the shank separating at least a portion of the shank from a remainder of the shank. Thereafter, the combustion products act on the member to deform the member to extend beyond the fracture at least a predetermined distance to move the portion of the shank at least the predetermined distance from the remainder of the shank.

BRIEF DESCRIPTION OF THE DRAWINGS

The foregoing and other features of the invention will become apparent to one skilled in the art to which the invention relates upon consideration of the following description of the invention with reference to the accompanying drawings, in which:

FIG. 11 is a perspective view of the actuatable fastener of FIG. 10, illustrating the installation of the fastener;

FIG. 13 is a sectional view of the actuatable fastener of FIG. 10 illustrating the fastener in an assembled and actuated condition;

DESCRIPTION OF THE INVENTION

The present invention relates to an actuatable fastener. The actuatable fastener may be used in a variety of applications. For example, the actuatable fastener may be used to effect separation or deployment functions for spacecraft, submersibles, and aircraft. In one particular application, the present invention relates to an actuatable fastener for use in an air bag module in which inflation fluid is selectively vented from the module in order to control the speed and force of deployment of the air bag. In this application, the present invention also relates to an actuatable fastener for selectively releasing a tether for limiting or otherwise restricting deployment of an air bag.

Figure 1:
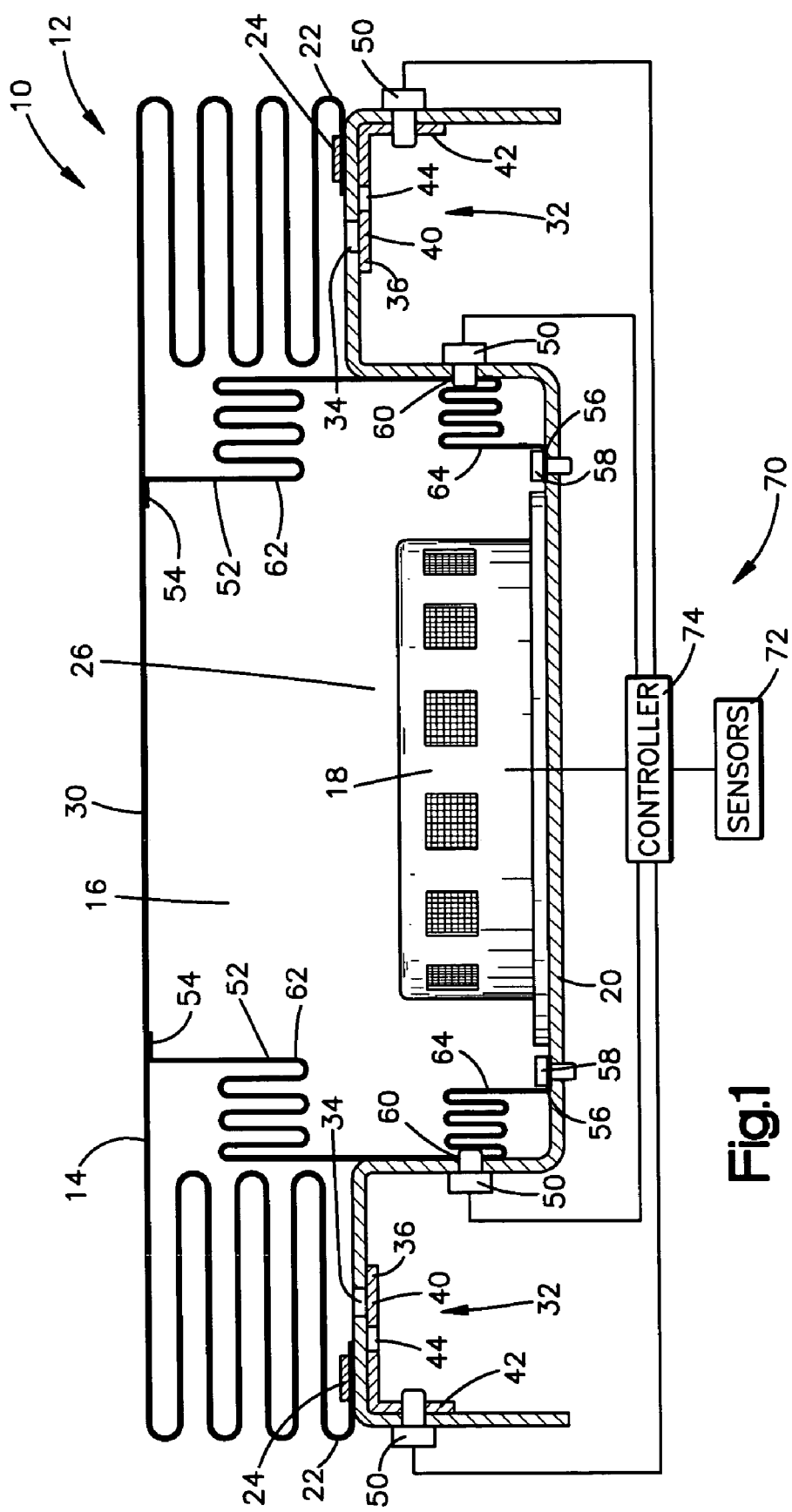
FIG. 1 is a schematic illustration, partially in section, of a vehicle occupant protection apparatus including an actuatable fastener of the present invention, illustrating the apparatus in a stored condition.
Figure 2:
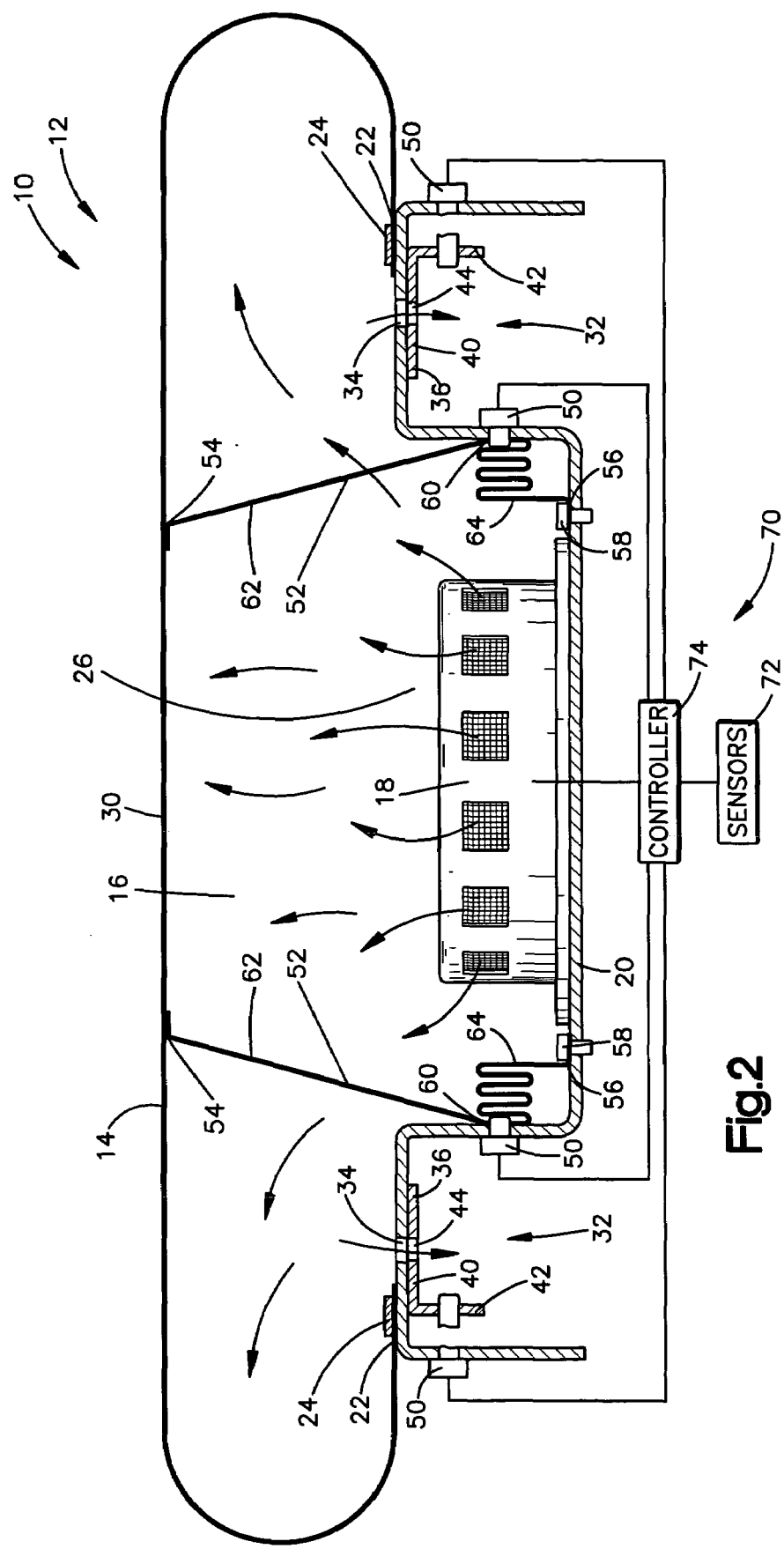
FIG. 2 is a schematic illustration, partially in section, of the apparatus of FIG. 1 in a first deployed condition.
Figure 3:
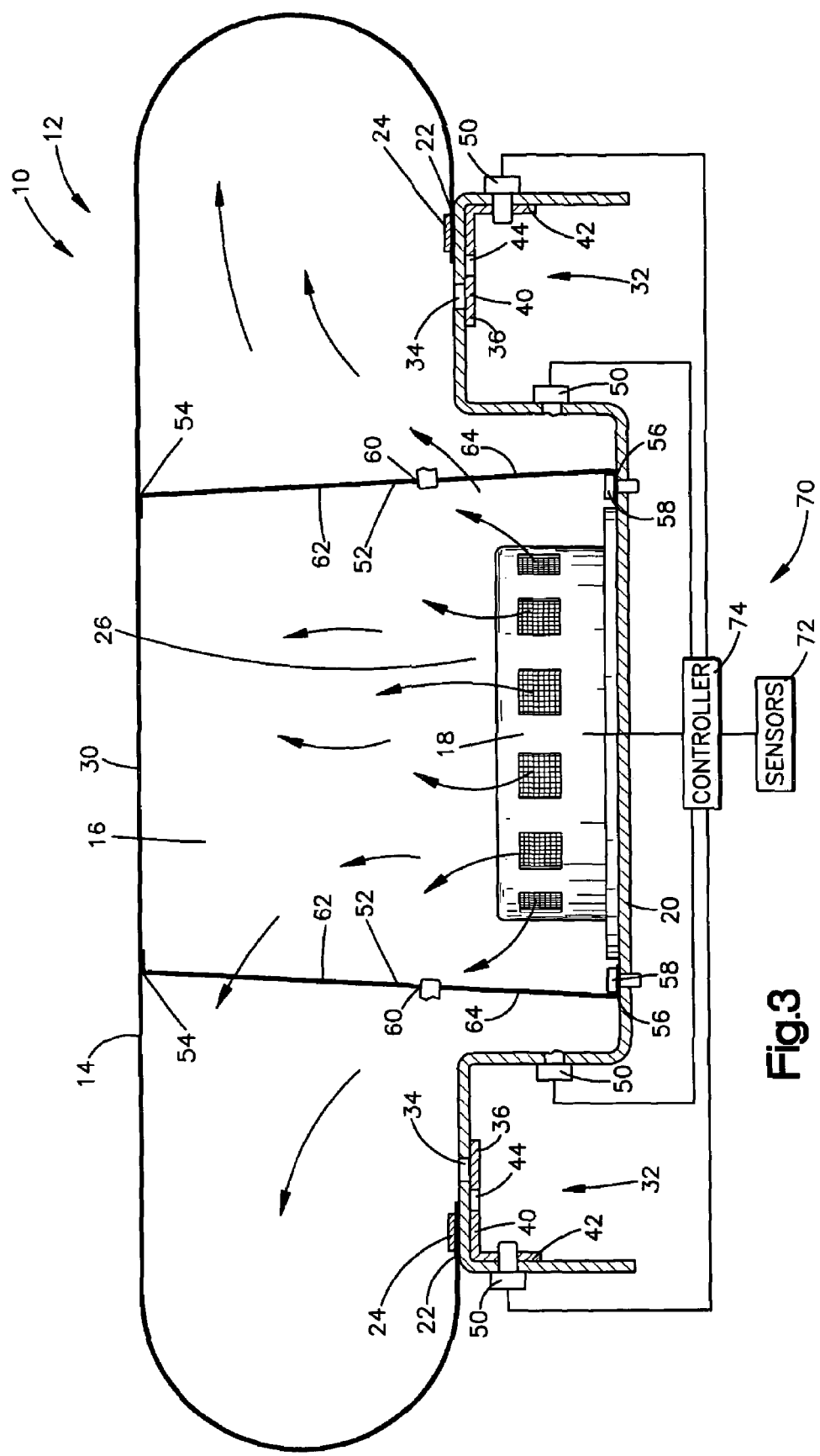
FIG. 3 is a schematic illustration, partially in section, of the apparatus of FIG. 1 in a second deployed condition.

As representative of the present invention, FIGS. 1–3 illustrate an apparatus 10 comprising a vehicle occupant protection apparatus in the form of an air bag module 12. The air bag module 12 includes an inflatable vehicle occupant protection device 14 of the type commonly known as an air bag. The air bag 14 may be constructed of any suitable material, such as woven nylon or plastic film. The air bag 14 helps define an inflatable volume 16.

The air bag module 12 of the illustrated embodiment is a front impact air bag module mountable on a driver side or passenger side of a vehicle. For example, in a driver side implementation, the air bag module 12 may be mounted on a steering wheel of the vehicle. In a passenger side implementation, the air bag module 12 may be mounted in an instrument panel of the vehicle. The construction of the air bag module 12 is illustrative of one exemplary configuration in which the actuatable fastener 50 of the present invention may be implemented. The air bag module 12 could, however, have alternative front impact air bag module configurations or be configured as an alternative type of air bag module, such as a side impact air bag module, an inflatable knee bolster module, or an inflatable side curtain module.

The air bag module 12 also includes an inflator 18 for providing inflation fluid for inflating the air bag 14. As known in the art, the inflator 18 may contain an ignitable gas-generating material that, when ignited, rapidly generates a large volume of gas. The inflator 18 may alternatively contain a stored quantity of pressurized inflation fluid, or a combination of pressurized inflation fluid and ignitable material for heating the inflation fluid. As a further alternative, the inflator 18 may have any known configuration suitable for providing inflation fluid for inflating the air bag 14.

The inflator 18 and the air bag 14 are supported on a support member 20. The support member 20 is a member or assembly that is fixed in position on the vehicle, that supports the inflator 18 and the air bag 14, and that receives the reaction forces of the inflator and the air bag when the inflator is actuated. In the illustrated embodiment, the support member 20 is a reaction plate.

In the embodiment illustrated in FIGS. 1–3, the reaction plate 20 is a single piece of material, such as metal or high strength plastic, that is formed to a desired configuration. The configuration of the reaction plate 20 is dependent on the architecture of the vehicle and the location in the vehicle in which it is installed. It will thus be appreciated that the configuration of the reaction plate 20 may depart from that illustrated in FIGS. 1–3.

A mouth portion 22 of the air bag 14 is secured to the reaction plate 20 by a retainer or retainer ring 24. The mouth portion 22 defines an inflation fluid opening 26 for receiving inflation fluid from the inflator 18. The inflation fluid opening 26 allows inflation fluid to flow from the inflator 18 into the inflatable volume 16 of the air bag 14 when the inflator is actuated. Opposite the mouth portion 22, the air bag 14 has an outer portion or panel 30 spaced from the reaction plate 20.

In the embodiment illustrated in FIGS. 1–3, the air bag module 12 includes two vents 32. The number and location of the vents 32 may vary. Each vent 32 includes a vent opening 34 formed in the reaction plate 20 and in fluid communication with the inflatable volume 16 of the air bag 14.

Each vent 32 also includes a vent member 36 slidably connected to the reaction plate 20. The vent members 36 are constructed of a high strength material, such as plastic or steel. In the embodiment illustrated in FIGS. 1–3, each vent member 36 has a generally L-shaped configuration including a main portion 40 and a flange portion 42. The main portion 40 includes an aperture 44 that extends through the vent member 36. In a closed condition of the vent 32 illustrated in FIGS. 1 and 3, the main portion 40 blocks inflation fluid flow through the vent opening 34. In an open condition of the vent 32 illustrated in FIG. 2, the vent member 36 is moved relative to the reaction plate 20 to a position such that the aperture 44 is aligned with the vent opening 34. Thus, in the open condition, the vent 32 permits inflation fluid flow from the inflatable volume 16 and/or the inflator 18 through the vent opening 34 and aperture 44.

An actuatable fastener 50 cooperates with the flange portion 42 to connect the vent member 36 to the reaction plate 20. The actuatable fastener 50 is actuatable to move the vent member 36 from the closed position of FIGS. 1 and 3 to the opened position of FIG. 2. Put another way, the actuatable fastener 50 is actuatable to actuate the vent 32 from the closed condition to the opened condition.

The air bag module 12 also includes one or more tethers 52 for controlling, limiting, or otherwise restricting deployment of the air bag 14. In the illustrated embodiment, two identical tethers 52 are provided. The tethers 52 may have any suitable configuration. In the embodiment illustrated in FIGS. 1–3, each tether 52 is a narrow, elongate piece or strip of fabric material. The tether 52 may be made from the same material as the air bag 14, or may be made from a different material. The tethers 52 are not, per se, part of the air bag 14, in the sense that the air bag can deploy and inflate regardless of whether the tethers are present or not. Thus, the air bag module 12 illustrated in FIGS. 1–3 could include the vents 32 and not the tethers 52, or vice versa.

Each tether 52 has a first end 54 that is fixed to the outer panel 30 of the air bag 14 by means (not shown), such as sewing. The first end 54 of the tether 52 is thus connected for movement with the air bag 14 as the air bag is inflated and deployed. Each tether 52 also has a second end 56, opposite the first end 54, that is connected with the reaction plate 20 by suitable means, such as a fastener 58.

An intermediate portion 60 of each tether 52, located between the first and second ends 54 and 56, is connected with the reaction plate 20 by an actuatable fastener 50. Each tether 52 has a first portion 62 extending between the first end 54 and the intermediate portion 60 and a second portion 64 extending between the second end 56 and the intermediate portion.

When the air bag 14 is in the deflated and stored condition of FIG. 1, the outer panel 30 of the air bag is positioned relatively close to the mouth portion 26. In this condition, there is a significant amount of slack in the tethers 52. As shown in FIG. 1, the first and second portions 62 and 64 of each tether 52 include slack when the air bag 14 is in the deflated and stored condition.

The apparatus 10 also includes electric circuitry indicated schematically at 70. The electric circuitry 70 includes sensors 72 operatively connected with a controller 74. The controller 74 is operatively connected with the inflator 18 and each of the actuatable fasteners 50. The controller 74 may comprise a single controller or multiple controllers and is operative to actuate the inflator 18 and the actuatable fasteners 50 selectively based on vehicle and/or occupant conditions determined via the sensors 72.

The sensors 72 include a crash sensor, such as an accelerometer for detecting vehicle accelerations indicative of a vehicle crash situation. The sensors 72 may also include vehicle condition and/or occupant condition sensors, such as occupant position sensors, occupant size or weight sensors, seat position sensors, seat belt buckle condition sensors, and seat belt tension sensors.

Upon sensing the occurrence of an event for which deployment of the air bag 14 is desired, the controller 74 is operative to actuate the inflator 18 and the actuatable fasteners 50 in accordance with vehicle conditions and/or occupant conditions determined via the sensors 72. When the inflator 18 is actuated, it emits a volume of inflation fluid into the inflatable volume 16 of the air bag 14 to inflate the air bag. Depending on the sensed vehicle and/or occupant conditions, the air bag 14 may be inflated to either the inflated condition illustrated in FIG. 2, or the inflated condition illustrated in FIG. 3.

The controller 74 actuates the air bag module to the inflated condition of FIG. 2 upon sensing an occupant positioned close to or within a predetermined distance of the air bag module 12. This may be the case, for example, when the controller 74 determines, via the sensors 72, that an occupant has adjusted his or her seat to its forwardmost position and is therefore seated close to the air bag module 12.

In the inflated condition of FIG. 2, respective ones of the actuatable fasteners 50 are actuated in order to actuate the vents 32 to the open condition. Also, in the inflated condition of FIG. 2, the intermediate portions 60 of the tethers 52 are kept connected to the reaction plate 20 by respective ones of the actuatable fasteners 50. As a result, the first portions 62 of the tethers 52 restrict deployment of the air bag 14 such that the outer panel 30 is maintained relatively close to the reaction plate 20. At the same time, inflation fluid is vented from the air bag module 12 through the vents 32.

The controller 74 actuates the air bag module to the inflated condition of FIG. 3 upon sensing an occupant in a normal seated position in which the occupant is positioned at least a predetermined distance away from the air bag module 12. This may be the case, for example, when the controller 74 detects, via the sensors 72, that an occupant has adjusted his or her seat to a predetermined rearward position and is therefore seated at least the predetermined distance away from the air bag module 12.

In the inflated condition of FIG. 3, respective ones of the actuatable fasteners 50 remain unactuated in order to maintain the vents 32 in the closed condition. Also, in the inflated condition of FIG. 3, respective ones of the actuatable fasteners 50 are actuated to release the intermediate portions 60 of the tethers 52 from the reaction plate 20. As a result, the tethers 52 permit full deployment of the air bag 14 such that the outer panel 30 is restricted only by the full length of the tethers 52. At the same time, inflation fluid is blocked from venting from the air bag module 12 through the vents 32.

Figure 4:
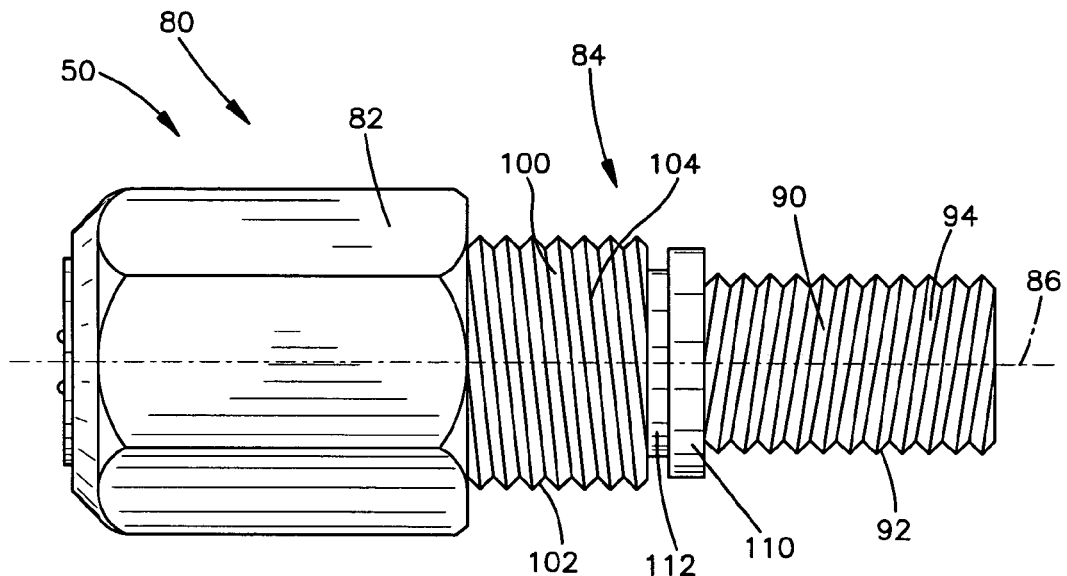
FIG. 4 is a side view of the actuatable fastener of FIG. 1, according to a first embodiment of the present invention.
Figure 5:
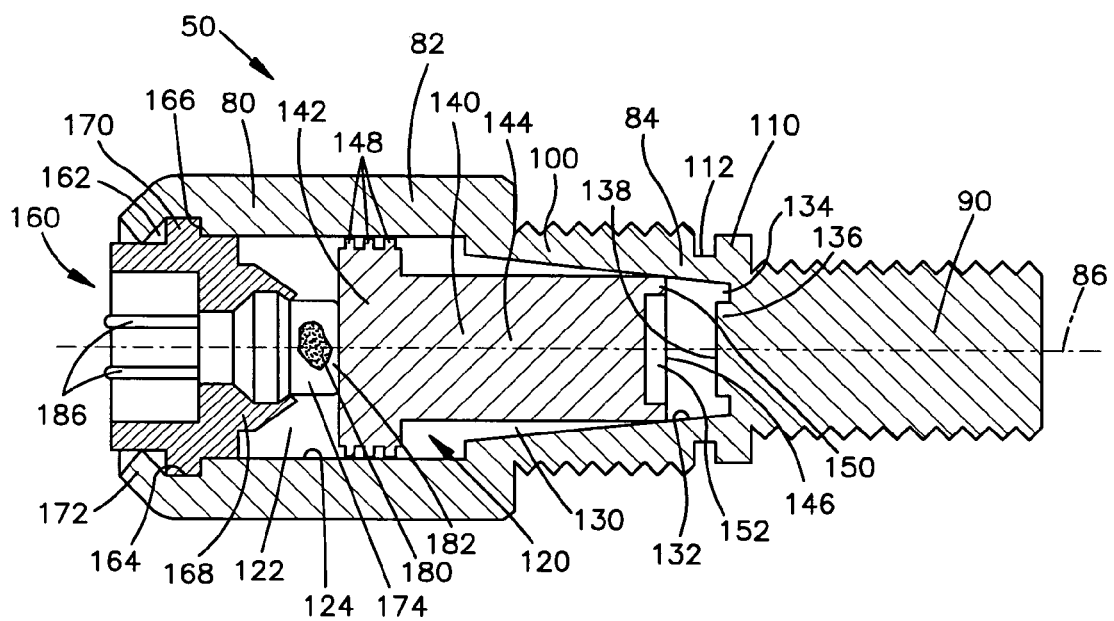
FIG. 5 is a cross-sectional view of the actuatable fastener of FIG. 4.
Figure 6:
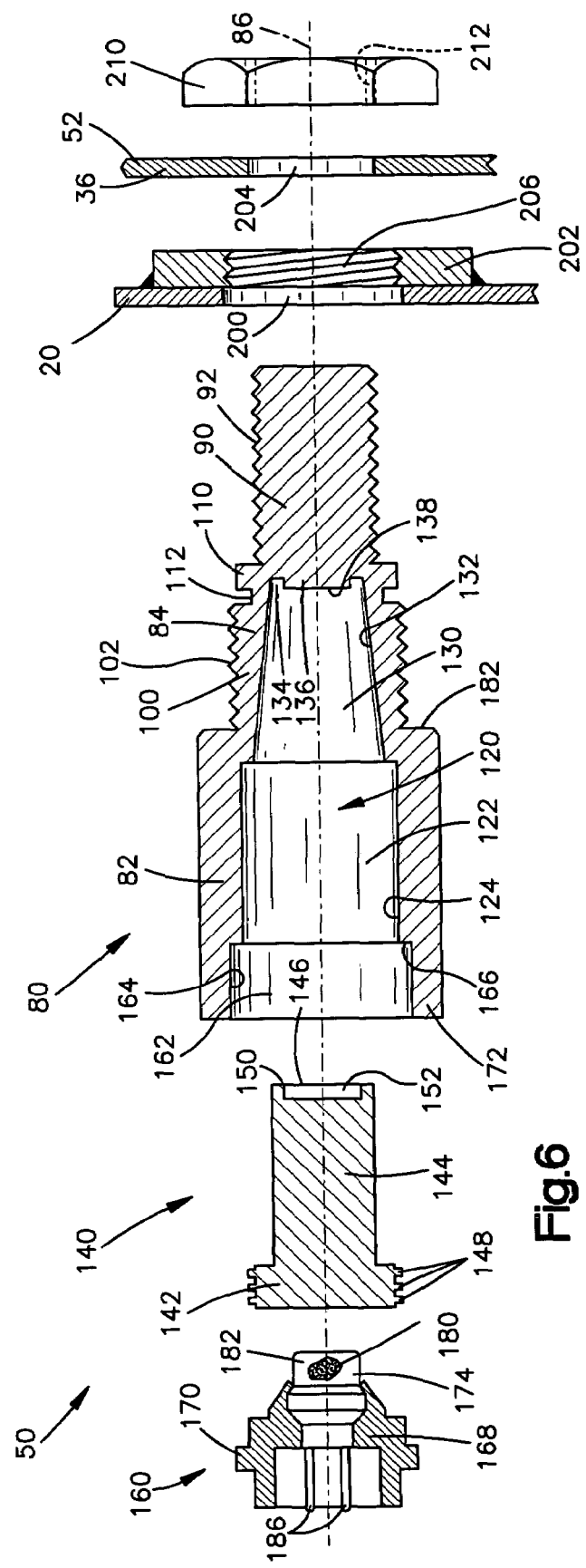
FIG. 6 is an exploded sectional view of the actuatable fastener of FIG. 4.

According to the present invention, the actuatable fasteners 50 used in conjunction with the vents 32 and the tethers 52 may be identical. An actuatable fastener 50 according to a first embodiment of the present invention is illustrated in FIGS. 4–6. Referring to FIG. 4, the actuatable fastener 50 includes a body 80 including a head 82 and a shank 84. In FIGS. 4–6, the head 82 has a hexagonal configuration. The head 82 could, however, have alternative configurations as will be discussed below. The head 82 and shank 84 share a common axis 86. The shank 84 includes a first shank portion 90 and a second shank portion 100. The first shank portion 90 forms a terminal end portion of the shank 84 and the body 80. The second shank portion 100 extends from the head 82 and is positioned between the head and the first shank portion 90.

The first shank portion 90 has an outer surface 92 that includes screw threads 94. The second shank portion 100 has an outer surface 102 that includes screw threads 104. The nominal diameter of the threaded first shank portion 90 is smaller than the nominal diameter of the threaded second shank portion 100. The body 80 also includes an annular shoulder portion 110 and an annular groove 112 both positioned between the first and second shank portions 90 and 100.

The annular groove 112 illustrated in the embodiment of FIGS. 4–6 has a rectangular cross-section. The groove 112 could, however, have an alternative cross-sectional configuration, such as a V-shaped or U-shaped configuration. The shoulder portion 110 is positioned adjacent the first shank portion 90 and the annular groove 112 is positioned adjacent the second shank portion 100. The shoulder portion 110 has a diameter that is larger than the nominal diameter of the first shank portion 90 and smaller than the nominal diameter of the second shank portion 100.

Referring to FIGS. 5 and 6, the body 80 of the actuatable fastener 50 includes an interior chamber 120 centered along the axis 86. The chamber includes a cylinder portion 122 defined by a cylindrical side wall 124 and a frustoconical sleeve portion 130 defined by a tapered side wall 132. The cylinder portion 122 is positioned within the head 82 of the body 80 and extends coaxially with the head. The sleeve portion 130 extends from the cylinder portion 122 into the second shank portion 100 and terminates at an end wall 138 adjacent the first shank portion 90. The side wall 132 is tapered from a first diameter adjacent the head 82 to a second, smaller, diameter at the end wall 138. The end wall 138 may include an annular ring-shaped recess 134 forming a cylindrical projection 136 at the end wall.

The actuatable fastener 50 also includes a member 140 disposed in the chamber 120. The member 140 includes a cylindrical portion that forms a piston 142 and a cylindrical portion that forms a punch 144. The piston 142 and punch 144 are centered on the axis 86 and are coaxial with each other. The piston 142 is disposed in the cylinder portion 122 of the chamber 120 and has an outside diameter slightly less than the diameter of the side wall 124. The piston may include one or more annular rings 148 formed on its outer surface. The rings 148 are positioned in sliding engagement with the side wall 124 when the actuatable fastener 50 is in the assembled condition of FIG. 3. The rings 148 form a tight fit with the side wall 124, which seals the cylinder portion 122 between the piston 142 and an initiator 160 of the actuatable fastener 50.

When the actuatable fastener 50 is in the assembled condition of FIG. 5, the punch 144 extends from the piston 142 through the cylinder portion 122 of the chamber 120 and into the sleeve portion 130. The side wall 132 of the sleeve portion 130 engages a terminal end 146 of the punch 144 at the position where the diameter of the side wall 132 equals the diameter of the punch. As illustrated in FIGS. 5 and 6, the punch 144 may include an annular rim 150 formed by a cylindrical recess 152 bored into the terminal end 146 of the punch.

The initiator 160 is supported in a support portion 162 of the chamber 120 located at a terminal end of the head 82. The initiator 160 extends from the support portion 162 into the cylinder portion 122 to a position adjacent or near the piston 142. As shown in FIG. 6, the support portion 162 is defined by a cylindrical side wall 164 that has a diameter larger than the diameter of the side wall 124 of the cylinder portion 122. An annular shoulder 166 is thus formed at the intersection of the side wall 164 and the side wall 124.

The initiator 160 includes support 168 and a squib 174 that is supported in the support by means such as crimping the support onto the squib. The support 168 is constructed of a high strength material, such as steel or aluminum, and includes an annular flange 170 that extends radially from an outer surface of the support.

The squib 174 includes a body of pyrotechnic material 180 supported in an end cap 182. The pyrotechnic material 180 is ignitable by providing electric current to the squib via a pair of electrical leads 186 protruding from the squib. Ignition of the pyrotechnic material 180 produces combustion products that rupture the end cap 182 and pressurize the cylinder portion 122 of the cavity 120 between the initiator and the piston 142.

The squib 174 may have any construction suitable for providing the desired pyrotechnic effect. For example, the squib 174 may be one such as those incorporated into a standard or known air bag inflator initiator. This product is a small, relatively inexpensive device, available at a low price in large quantities from a number of different vendors. The pyrotechnic material 180 used in the squib 174 may be any known material that, when ignited, provides combustion properties suited to propel the member 140 with the desired force. For example, the pyrotechnic material may include a metal fuel, such as zirconium, and an inorganic oxidizer, such as potassium perchlorate. Such a zirconium potassium perchlorate pyrotechnic material may combust with a caloric output sufficient to propel the member 140, while producing a relatively low gas output, since metal oxides and chlorides are the principal products.

Referring to FIG. 5, when the actuatable fastener 50 is in the assembled condition, the annular flange 170 of the initiator 160 is seated against the annular shoulder 166. An annular terminal end portion 172 of the head 82 is crimped over the flange 70 to secure the initiator 160 in the support portion 162. Those skilled in the art, however, will appreciate that the initiator 160 could be secured in the support portion 162 in an alternative anner. For example, the initiator 160 could be secured in the support portion 162 by screw threads.

Figure 7:
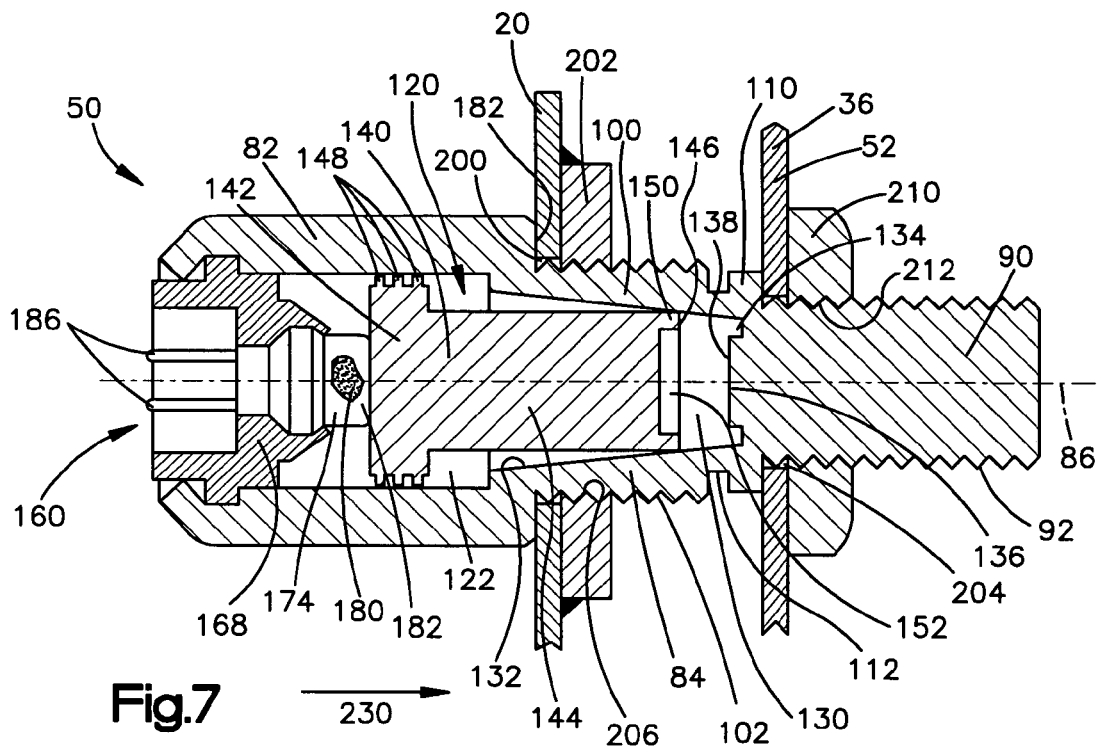
FIG. 7 is a sectional view of the actuatable fastener of FIG. 4 illustrating the fastener in an assembled and unactuated condition.

Assembly of the actuatable fastener 50 to the air bag module 12 is illustrated in FIGS. 6 and 7. FIGS. 6 and 7 are representative of the assembly of the actuatable fastener 50 with the reaction plate 20 and the vent member 36, and also with the reaction plate and the tether 52. The vent member 36 and tether 52 are illustrated schematically and interchangeably in FIGS. 6 and 7.

When the fastener 50 is assembled with the reaction plate 20, the first shank portion 90 is passed through a fastener opening 200 in the reaction plate, through means such as a nut 202 welded or otherwise connected to the reaction plate, and into a fastener opening 204 in the vent member 36/tether 52. The second shank portion 100 extends through the opening 200 and the threads 102 engage threads 206 of the nut 202.

The actuatable fastener 50 is rotated about the axis 86 to effectuate mating engagement of the threads 102 and 206. This draws the second shank portion 100 through the fastener opening 200 until a shoulder surface 182 of the head 82 engages the reaction plate 20. The actuatable astener 50 is thus connected to the reaction plate 20 via the second shank portion 100 and the nut 202.

Simultaneously or thereafter, the first shank portion extends through the fastener opening 204 until the shoulder 110 engages the vent member 36/tether 52. The tether 52 may include means (not shown), such as a grommet or washer, sewn into the tether to reinforce the opening 204. A hex nut 210 is placed over the first shank portion 90 until the threads 92 engage threads 212 of the hex nut 210. The hex nut 210 is then rotated about the axis 86 to effectuate mating engagement of the threads 92 and 212. This draws the hex nut 210 over first shank portion 90 until the vent member 36/tether 52 is clamped between the hex nut and the shoulder 110. The actuatable fastener 50 is thus connected to the vent member 36/tether 52 via the first shank portion 90 and the nut 210. The actuatable fastener 50 thus may be used to connect the vent member 36 to the reaction plate 20 and may also be used to connect the tether 52 to the reaction plate.

According to the present invention, the first and second shank portions 90 and 100 of the actuatable fastener 50 may be threaded in opposite directions. As shown in FIG. 4, the threads 94 of the first shank portion 90 are left hand threads and the threads 104 of the second shank portion 100 are right hand threads. Thus, the actuatable fastener 50 is rotated about the axis 86 in a clockwise direction as viewed from the left in FIG. 4 to connect the second shank portion 100 to the reaction plate 20. The hex nut 210 is then rotated about the axis 86 in the same rotational direction (i.e., clockwise as viewed from the left in FIG. 2) to connect the first shank portion 90 to the vent member 36/tether 52. Advantageously, this helps prevent inadvertent loosening of the second shank portion 100 from the reaction plate 20 while tightening the hex nut 210 onto the first shank portion 90.

Figure 8:
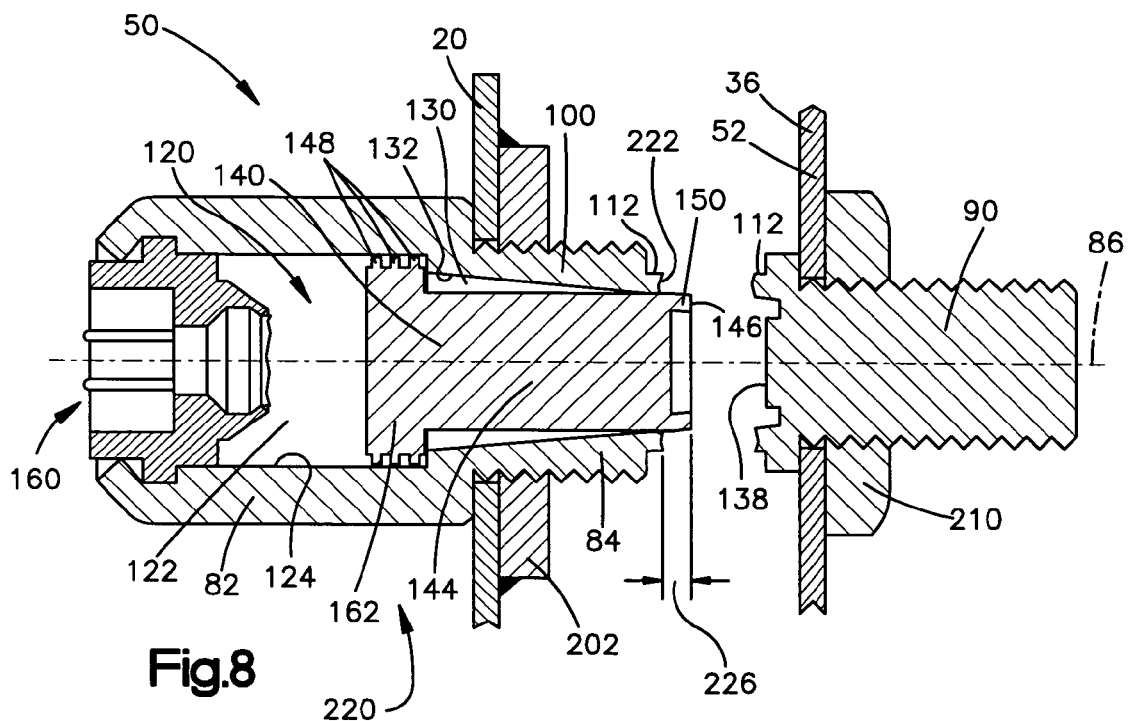
FIG. 8 is a sectional view of the actuatable fastener of FIG. 4 illustrating the fastener in an assembled and actuated condition.

Referring to FIGS. 7 and 8, upon the occurrence of an event for which actuation of the actuatable fastener 50 is desired, an electric current is provided to the initiator 160 via the terminals 186 to effectuate ignition of the body of pyrotechnic material 180. The pyrotechnic material 180, when ignited, produces combustion products, including heat, particles, and a luminous flash. Ignition of the pyrotechnic material 180 ruptures the end cap 182, which releases the combustion products into the cylinder portion 122 of the chamber 120. Heat released during ignition of the pyrotechnic material 180 heats air in the cylinder portion 122, which causes the air to expand. The expanding air pressurizes the chamber 120 and acts on the piston 142 to urge the member 140 to move along the axis 86 toward the end wall in a direction generally to the right as indicated by the arrow labeled 230 in FIG. 7.

The member 140 deforms as it moves along the axis 86 in the direction 220. This is described in further detail below. As the member 140 moves along the axis 86, the terminal end portion 146 of the punch 144 eventually engages the end wall 138. When the terminal end portion 146 of the punch 144 engages the end wall 138, the rim 150 is received in the groove 134 and the projection 136 is received in the recess 152. The member 140 exerts a force on the end wall 138 via the terminal end 146 of the punch 144. This creates a tensile force that acts on the portion of the shank 84 extending between the vent member 36/tether 52 and the reaction plate 20.

In the area of the annular groove 112, the shank 84 has a side wall that is thinner than other portions of the shank. The tensile force thus causes the shank 84 to rupture in the area of the annular groove 112 because the thin walled groove is more susceptible to failure under tensile loads than the remainder of the shank. Referring to FIG. 8, rupture of the shank 84 causes separation of the first and second shank portions 90 and 100, which disconnects the vent member 36/tether 52 from the reaction plate 20.

Upon actuation of the actuatable fastener 50, the first shank portion 90 is separated from the second shank portion 100 quickly. For example, the first and second shank portions 90 and 100 may become separated in 1–2 milliseconds, or less. This separation time is due to a variety of factors. The terminal end 146 of the punch 144, being positioned close to the end wall 138 of the chamber 120, strikes the end wall quickly upon actuation of the initiator 160. Also, the piston 142, being positioned close to the initiator 160, forms a low-volume combustion area, so pressure increases rapidly when the initiator is actuated. Further, the shank 84 may be constructed of a material having a low ultimate elongation (i.e., percent elongation at failure), which causes the rupture to form quickly.

The actuatable fastener 50 is configured such that, when actuated, the first and second shank portions 90 and 100 remain connected to the vent member 36/tether 52 and reaction plate 20, respectively. This is because the weld nut 202 fixedly connects the second shank portion 100 to the reaction plate 20 and the nut 212, together with the shoulder 110, fixedly connects the first shank portion 90 to the vent member 36/tether 52. Advantageously, this helps prevent portions of the actuatable fastener 50 from being thrown or otherwise projected when the fastener is actuated.

The actuatable fastener 50 is also configured to help block the combustion products from escaping the chamber 120 when the initiator 160 is actuated. According to the present invention, the rings 148 of the piston 142 have a close and tight fit with the side wall 124 of the cylinder portion 122, which helps form a seal for containing the combustion products. To permit the piston 142 to move despite this fit, the rings 148 may bend, deflect, or otherwise deform as a result of friction with the side wall 124. By this design, the piston 142 is permitted to move along the cylinder portion 122 of the chamber 120 while the rings 148 maintain the seal between the piston and the side wall 124.

Also, according to the present invention, the engagement of the punch 144 and the tapered side wall 132 of the sleeve 130 forms a seal that further helps to prevent escape of the combustion products. As the member 140 moves along the axis 86, the interference between side wall 132 and the punch 144 increases. Since the side wall 132 has a tapered configuration, the interference is realized initially at the location where the terminal end 146 of the punch 144, specifically the rim 150, engages the side wall. As the member 140 moves farther along the axis 86, the interference between the side wall 132 and the punch 144 increases. As a result, the rim 150 conforms to the taper of the side wall 132 and deflects inward toward the axis 86. This helps maintain the seal between the punch 144 and the side wall 132. The member 140 continues to move along the axis 86 until the terminal end 146 of the punch 144 engages the end wall 138 and ruptures the shank 84, as described above.

As the mating surfaces of the punch 144 and sleeve 130 are worked against each other, the materials of the punch and sleeve conform with each other, which helps block leakage of the combustion products from the chamber 120. In fact, the frictional engagement between the punch 144 and the sleeve 130 may result in a friction weld between the punch and the sleeve. Thus, when the actuatable fastener 50 is in the actuated condition of FIG. 8, the seal between the punch 144 and the side wall 132 may be maintained even though the shank 84 is ruptured. The seal between the side wall 132 and the punch 144 helps prevent escape of combustion products when the fastener 50 is actuated.

Referring to FIGS. 1–3, it will be appreciated that, in order to actuate the vent 32, the actuatable fastener must propel the vent member 36 a distance sufficient to align the aperture 44 with the vent opening 34. According to the present invention, the actuatable fastener 50 is constructed such that the member 140 propels the first shank portion 90, when ruptured and separated from the second shank portion 100, a minimum distance from the remainder of the actuatable fastener.

Referring to FIG. 8, when the actuatable fastener 50 is actuated, a rupture or fracture 222 is produced in the shank 84 at the location of the annular groove 112. This separates the first shank portion 90 from the remainder of the actuatable fastener 50. The remainder of the fastener, indicated at 220, thus has a terminal end at the location of the rupture or fracture 222. According to the present invention, the terminal end 146 of the punch 144 extends beyond the terminal end (i.e., the fracture 222) of the remainder 220 of the actuatable fastener 50. The first shank portion 90, when ruptured from the remainder 220 of the actuatable fastener 50, is moved at least a minimum distance, referred to herein as a minimum displacement, measured between the terminal end 146 of the punch 144 and the terminal end of the remainder 220 of the fastener. This minimum displacement is indicated at 226 in FIG. 8.

Accordingly, it will be appreciated that the actuatable fastener 50 may be configured to produce a desired minimum displacement 226 between the first and second shank portions 90 and 100 when the fastener is actuated. This is accomplished by configuring the fastener 50 such that the terminal end 146 of the punch 144 moves a desired minimum distance beyond the terminal end surface of the remainder 220 of the fastener 50. For example, if a minimum displacement 226 of three millimeters (3.0 mm) is desired, the actuatable fastener 50 may be configured such that the terminal end 146 of the punch 144 extends three millimeters beyond the terminal end of the remainder 220 of the fastener when the fastener is actuated.

The body 80 and member 140 of the actuatable fastener 50 may be constructed of a variety of materials, such as metal, plastic, or a combination of metal and plastic. Those skilled in the art, however, will appreciate that the type of materials selected to construct the member 140 and the body 80 may be affected by the operation of the actuatable fastener 50 described above. For example, the body 80 should have a high tensile strength to withstand the pressure in the chamber 120, moderate to low ultimate elongation to help ensure a quick and clean break at the annular groove 112, and moderate ductility to facilitate sealing engagement with the member 140. The member 140 needs to be hard enough to break the shank portion 84, and yet somewhat ductile in the areas where the member engages the body 80 to help ensure a tight seal.

To achieve these goals, the member 140 may be constructed of a base material having a hardness greater than the hardness of the material used to construct the body 80. In this construction, the member 140 may include an outer layer of a relatively soft material having a hardness less than the hardness of the material used to construct the body 80. In one exemplary construction, the body 80 may be constructed of a cast metal alloy, such as an aluminum or zinc alloy, and the member 140 may be constructed of a hard metal, such as steel, that is coated with a softer material, such as plastic or a metal (e.g., zinc) alloy.

In another exemplary construction, the body 80 may be constructed of a molded plastic material and the member 140 may be constructed of a metal or metal alloy that may or may not be coated with a softer material, such as plastic. One such construction is described below in the fourth embodiment of the invention. Those skilled in the art, however, will appreciate that the components of the actuatable fastener 50 may be constructed of any suitable metal or plastic material or any suitable combination of metal and plastic materials.

The actuatable fastener 50 is further configured to help prevent rattling of the member 140 within the chamber 120 prior to actuation of the fastener. As shown in FIGS. 3 and 5, prior to actuation of the fastener 50, the piston 142 is positioned against the initiator 160 and the terminal end 146 (i.e., the rim 150) is positioned against the side wall 132. The member 140 may thus be held against movement in the chamber 120 and prevented from producing rattling or other undesirable audible noise, which may occur, for example, as a result of normal vehicle driving movements, prior to actuation of the fastener 50. Also, the materials (e.g., soft metal, plastic) selected to construct the mating portions of the member 140 and the body 80 may help to dampen or deaden rattling of the actuatable fastener 50.

Figure 9:
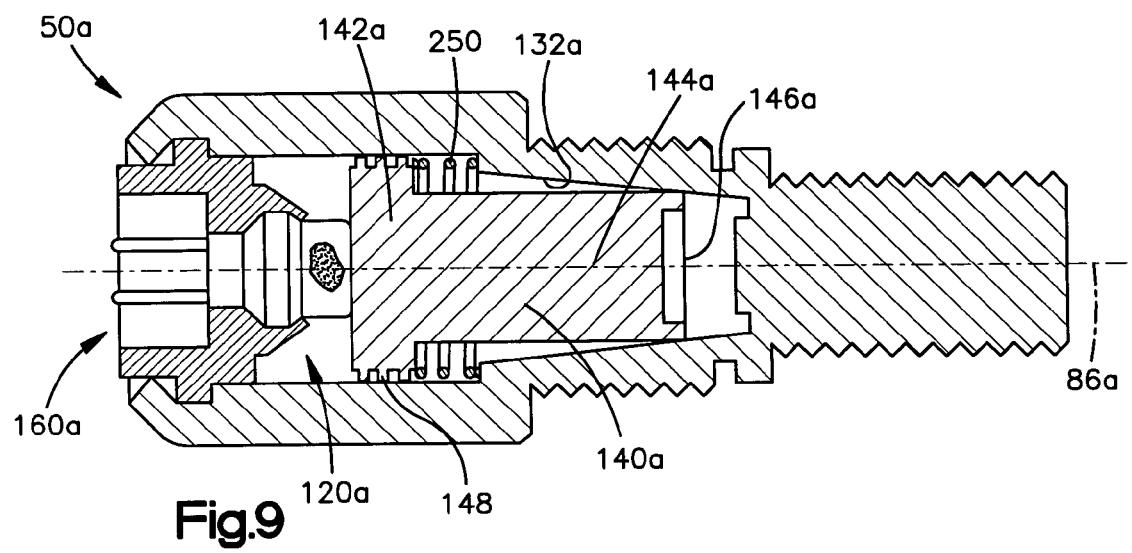
FIG. 9 is a sectional view of the actuatable fastener of FIG. 1, according to a second embodiment of the present invention.

An actuatable fastener in accordance with a second embodiment of the present invention is illustrated in FIG. 9. The actuatable fastener of the second embodiment of the invention is similar to the actuatable fastener of first embodiment of the invention illustrated in FIGS. 4–8. Accordingly, numerals similar to those of FIGS. 4–8 will be utilized in FIG. 9 to identify similar components, the suffix letter "a" being associated with the numerals of FIG. 9 to avoid confusion. The actuatable fastener of the second embodiment of the present invention is similar to the actuatable fastener of the first embodiment (FIGS. 4–8), except that the actuatable fastener of the second embodiment includes additional anti-rattling means.

Referring to FIG. 9, the actuatable fastener 50a includes a spring 250 that biases the member 140a against the initiator 160a. The piston 142a is thus supported between the initiator 160a and the spring 250, which helps support the member 140a against rattling in the chamber 120a. This may allow the terminal end 146a of the punch 144a to be spaced from the side wall 132a. Alternatively, the terminal end 146a of the punch 144a may engage the side wall 132a (as shown in FIG. 9) to enhance the anti-rattling feature of the actuatable fastener 50a. When the initiator 160a is actuated, the piston 142a acts on the spring 250 and overcomes the bias of the spring, which allows the piston, and thus the member 140a, to move along the axis 86a.

An actuatable fastener in accordance with a third embodiment of the present invention is illustrated in FIGS. 10–13. The actuatable fastener of the third embodiment of the invention is similar to the actuatable fastener of first embodiment of the invention illustrated in FIGS. 4–8. Accordingly, numerals similar to those of FIGS. 4–8 will be utilized in FIGS. 10–13 to identify similar components, the suffix letter "b" being associated with the numerals of FIGS. 10–13 to avoid confusion. The actuatable fastener of the third embodiment of the present invention is similar to the actuatable fastener of the first embodiment (FIGS. 4–8), except that the shank portion of the third embodiment is a frictional connector instead of a threaded connector.

Figure 10:
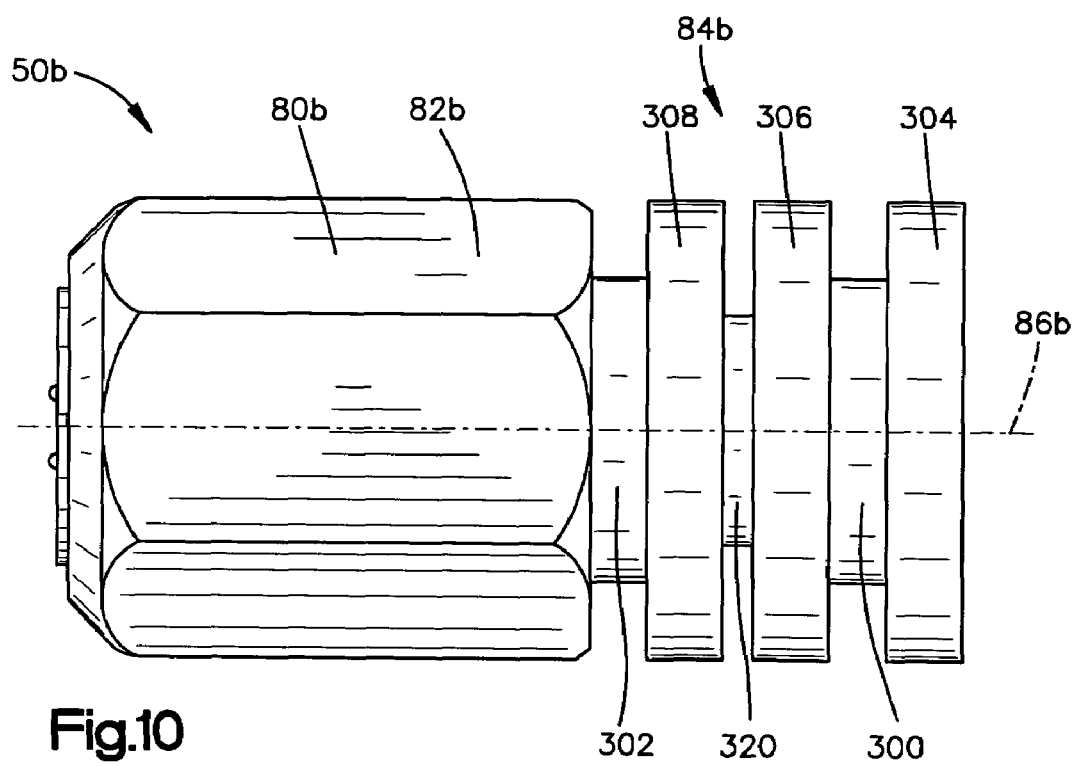
FIG. 10 is a side view of the actuatable fastener of FIG. 1, according to a third embodiment of the present invention.

Referring to FIG. 10, the actuatable fastener 50b includes a body 80b including a head 82b and a shank 84b. In the third embodiment, the shank 84b includes generally cylindrical first and second shank portions 300 and 302, respectively. The shank 84b also includes three cylindrical shoulder portions indicated at 304, 306, and 308, respectively. The first shank portion 300 is positioned between two of the shoulder portions 304 and 306. The second shank portion 302 is positioned between the shoulder portion 308 and the head 82b. The shank 84b also includes an annular recess 320 positioned between the shoulder portions 306 and 308.

The first and second shank portions 300 and 302 have diameters that are about equal to each other and smaller than the diameter of both the head 82b and the shoulder portions 304, 306, and 308. The annular recess 320 has a diameter that is smaller than the diameter of the first and second shank portions 300 and 302. The annular recess 320 thus forms an area of the shank 84b having a wall thickness (see FIG. 12) that is thinner than the remaining wall portions of the shank.

Figure 12:
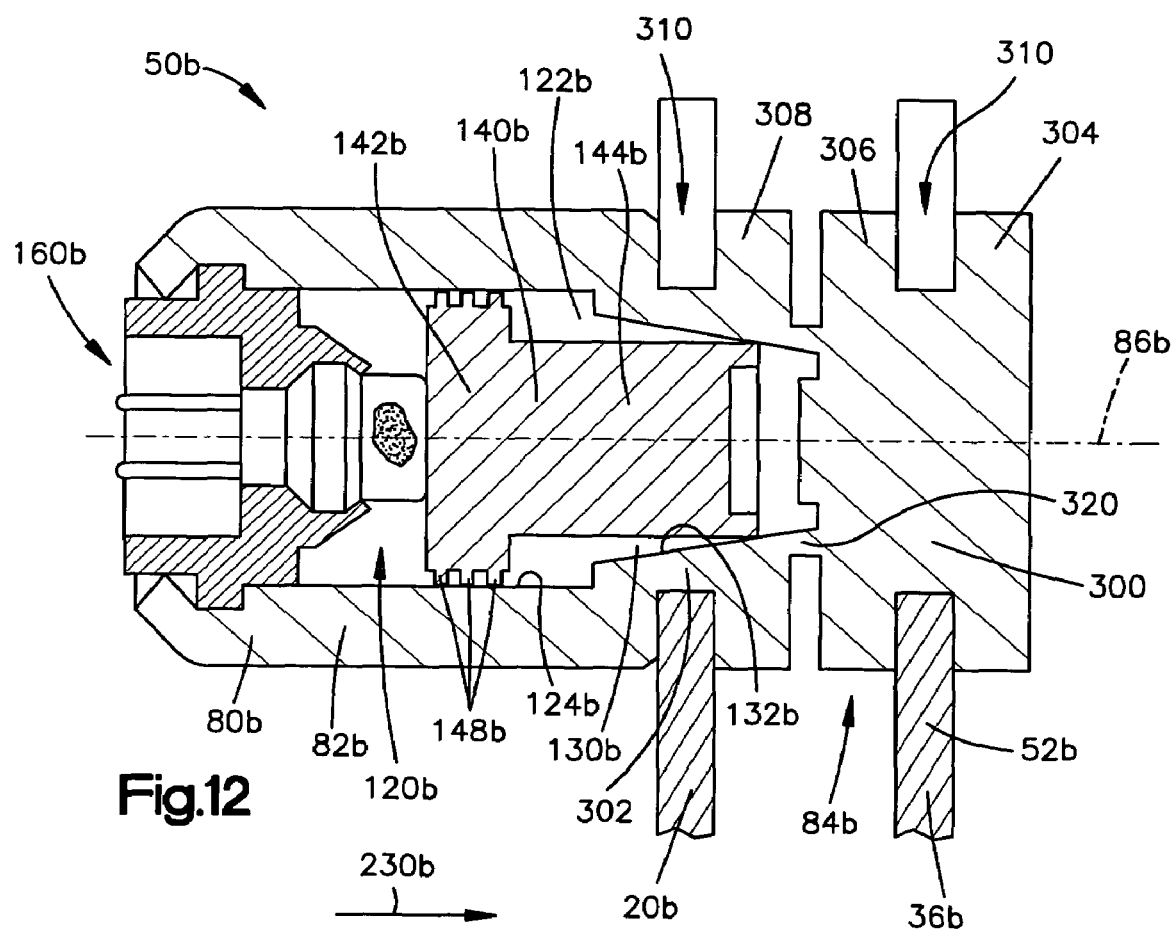
FIG. 12 is a sectional view of the actuatable fastener of FIG. 10 illustrating the fastener in an assembled and unactuated condition.

Referring to FIG. 12, the body 80b forms a chamber 120b configured in a manner that may be similar or identical to the chamber 120, 120a of the first and second embodiments. In general, the sleeve portion 130b has a shape that follows the shape of the sleeve portion 130, 130a of the first and second embodiments, but with different proportions. In the embodiment illustrated in FIGS. 10–13, the sleeve portion 130b has a shortened length to account for the shortened length of the shank 84b.

The actuatable fastener 50 also includes a member 140*b* that is disposed in the chamber 120*b*. The member 140*b* includes a portion that forms a piston 142*b* and a portion that forms a punch 144*b*. The member 140*b* may be configured in a manner similar or identical to the member 140, 140*a* of the first and second embodiments. In general, the member 140*b* has a shape that follows the shape of the member 140, 140*a* of the first and second embodiments, but with different proportions. In the embodiment illustrated in FIGS. 10–13, the member 140*b* has a shortened length to account for the shortened length of the sleeve 130*b*.

The actuatable fastener 50*b* also includes an initiator 160*b* that may be similar or identical to the initiator of the first and second embodiments. The initiator 160*b* is housed in and secured to the head 82*b* in a manner similar or identical to that used to house and secure the initiator 160, 160*a* of the first and second embodiments. As with the previous embodiments, the actuatable fastener 50*b* may be used to connect either the vent member 36*b* or the tether 52*b* to the reaction plate 20*b*.

Referring to FIG. 11, according to the third embodiment, both the reaction plate 20*b* and the vent member 36*b*/tether 52*b* include a slot 310. To provide the slot 310 in the tether 52*b*, it may be necessary to provide reinforcement (not shown), such as a metal plate with the tether. Each slot 310 includes an opening 312 that intersects a respective edge 314 of the vent member 36*b*/tether 52*b* and the reaction plate 20*b*. Each slot 310 has a width about equal to the diameter of the first and second shank portions 300 and 302.

When the vent member 36*b* is in the closed position, the respective slots 310 in the vent member and reaction plate 20*b* are positioned in an overlying and aligned relationship with each other. Likewise, when the tether 52*b* is positioned adjacent the reaction plate 20*b*, their respective slots 310 are positioned in an overlying and aligned relationship with each other. When the slots 310 are aligned with each other as shown in FIG. 12, the shank portion 84*b* is insertable into the aligned slots, as indicated by the dashed lines in FIG. 11.

Referring to FIGS. 11–13, when the fastener 50*b* is inserted in the slots 310, the reaction plate 20*b* is positioned between the head 82*b* and the shoulder portion 308, and the vent member 36*b*/tether 52*b* is positioned between the shoulder portions 304 and 306. The fastener 50*b* thus connects the vent member 36*b*/tether 52*b* to the reaction plate 20*b*. The actuatable fastener 50*b* may be maintained in the slots 310 in several manners. For example, the reaction plate 20*b* and vent member 36*b* may be biased away from each other to create a frictional engagement between the reaction plate and the head portion 82*b* and between the vent member and the shoulder portion 304. Alternatively, the shank portion 84*b* and the slots 310 may be dimensioned to provide an interference fit for maintaining the actuatable fastener 50*b* may be maintained in the slots. As a another alternative, additional means, such as an adhesive, could be used to help connect the actuatable fastener 50*b* to the reaction plate 20*b* and the vent member 36*b*/tether 52*b*.

Referring to FIG. 12, when the actuatable fastener 50*b* is actuated, the member 140*b* is propelled to move along the axis 86*b* in the direction 230*b*. The member 140*b* ruptures the shank 84*b* in the area of the annular groove 320 in a manner identical to that described above in regard to the first embodiment. As with the first and second embodiments, the rupture forms quickly (e.g., in less than 2.0 milliseconds).

Referring to FIG. 13, rupture of the shank 84*b* causes separation of the first and second shank portions 300 and 302, which disconnects the vent member 36*b*/tether 52*b* from the reaction plate 20*b*. The first and second shank portions 300 and 302 remain connected to the vent member 36*b*/tether 52*b* and the reaction plate 20*b*, respectively.

The actuatable fastener 50*b* helps block the combustion products from escaping the chamber 120*b* in a manner identical to that described above in regard to the first embodiment. The rings 148*b* of the piston 142*b* have a close and tight fit with the side wall 124*b* of the cylinder portion 122*b*, which helps form a seal for containing the combustion products. The piston 142*b* is permitted to move along the cylinder portion 122*b* while the rings 148*b* maintain the seal between the piston and the side wall 124*b*. Also, engagement of the punch 144*b* and the tapered side wall 132*b* of the sleeve 130*b* forms a seal that further helps to prevent escape of the combustion products.

As the member 140*b* moves along the axis 86*b* and the interference between side wall 132*b* and the punch 144*b* increases, the mating surfaces of the punch and sleeve are worked against each other. The materials of the punch 144*b* and side wall 132*b* conform with each other and form the seal, which helps block leakage of the combustion products from the chamber 120*b*. Thus, when the actuatable fastener 50*b* is in the actuated condition of FIG. 13, the seal between the punch 144*b* and the side wall 132*b* is maintained even though the shank 84*b* is ruptured. The seal between the side wall 132*b* and the punch 144*b* helps prevent escape of combustion products when the fastener 50*b* is actuated.

As shown in FIG. 13, the terminal end 146*b* of the punch 144*b* extends beyond the terminal end surface 222*b* of the remainder 220*b* of the actuatable fastener 50*b* when the fastener is actuated. The actuatable fastener 50*b* thus has a minimum displacement 226*b* similar to that of the first and second embodiments. The actuatable fastener 50*b* may thus be used to effectuate movement of the vent member 36*b* the distance required to place the vent member in the open condition.

An actuatable fastener in accordance with a fourth embodiment of the present invention is illustrated in FIGS. 14–17. The actuatable fastener of the fourth embodiment of the invention is similar to the actuatable fastener of first embodiment of the invention illustrated in FIGS. 4–8. Accordingly, numerals similar to those of FIGS. 4–8 will be utilized in FIGS. 14–17 to identify similar components, the suffix letter "c" being associated with the numerals of FIG. 14–17 to avoid confusion.

Figure 14:
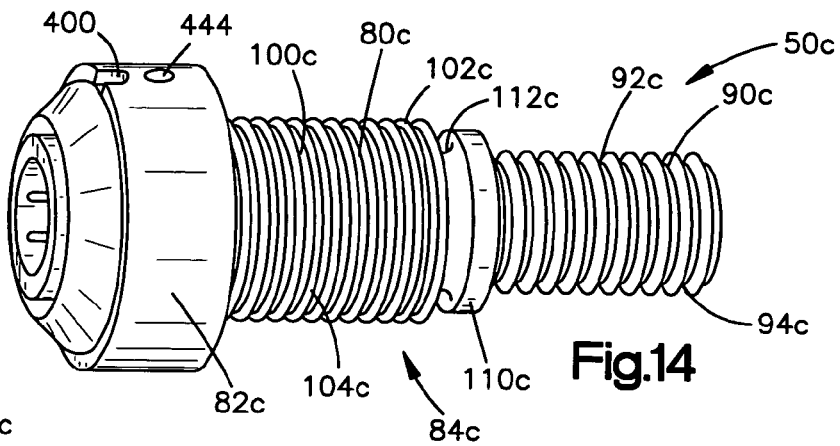
FIG. 14 is a perspective view of the actuatable fastener of FIG. 1, according to a fourth embodiment of the present invention.

Referring to FIG. 14, the actuatable fastener 50*c* comprises a body 80*c* including a head 82*c* and a shank 84*c*. In the fourth embodiment, the head 82*c* has a cylindrical configuration with a pair of recesses 400 for cooperating with a tool, such as a wrench. The head 82*c*, could, however, have alternative configurations, such as the hexagonal configuration of the previous embodiments. The head 82*c* and shank 84*c* share a common axis 86*c*. The shank 84*c* includes a first shank portion 90*c* and a second shank portion 100*c*. The first shank portion 90*c* forms a terminal end portion of the shank 84*c* and the body 80*c*. The second shank portion 100*c* extends from the head 82*c* and is positioned between the head and the first shank portion 90*c*.

The first shank portion 90*c* has an outer surface 92*c* that includes screw threads 94*c*. The second shank portion 100*c* has an outer surface 102*c* that includes screw threads 104*c*. The nominal diameter of the threaded first shank portion 90*c* is smaller than the nominal diameter of the threaded second shank portion 100*c*.

The body 80*c* also includes an annular shoulder portion 110*c* and an annular groove 112*c* that are both positioned between the first and second shank portions 90*c* and 100*c*. The annular groove 112*c* of the fourth embodiment has a U-shaped cross-section. The groove 112c could, however, have an alternative cross-sectional configuration, such as a rectangular or V-shaped configuration. The shoulder portion 110c is positioned adjacent the first shank portion 90c and the annular groove 112c is positioned adjacent the second shank portion 10c. The shoulder portion 110c has a diameter that is larger than the nominal diameter of the first shank portion 90c and smaller than the nominal diameter of the second shank portion 10c.

Figure 16:
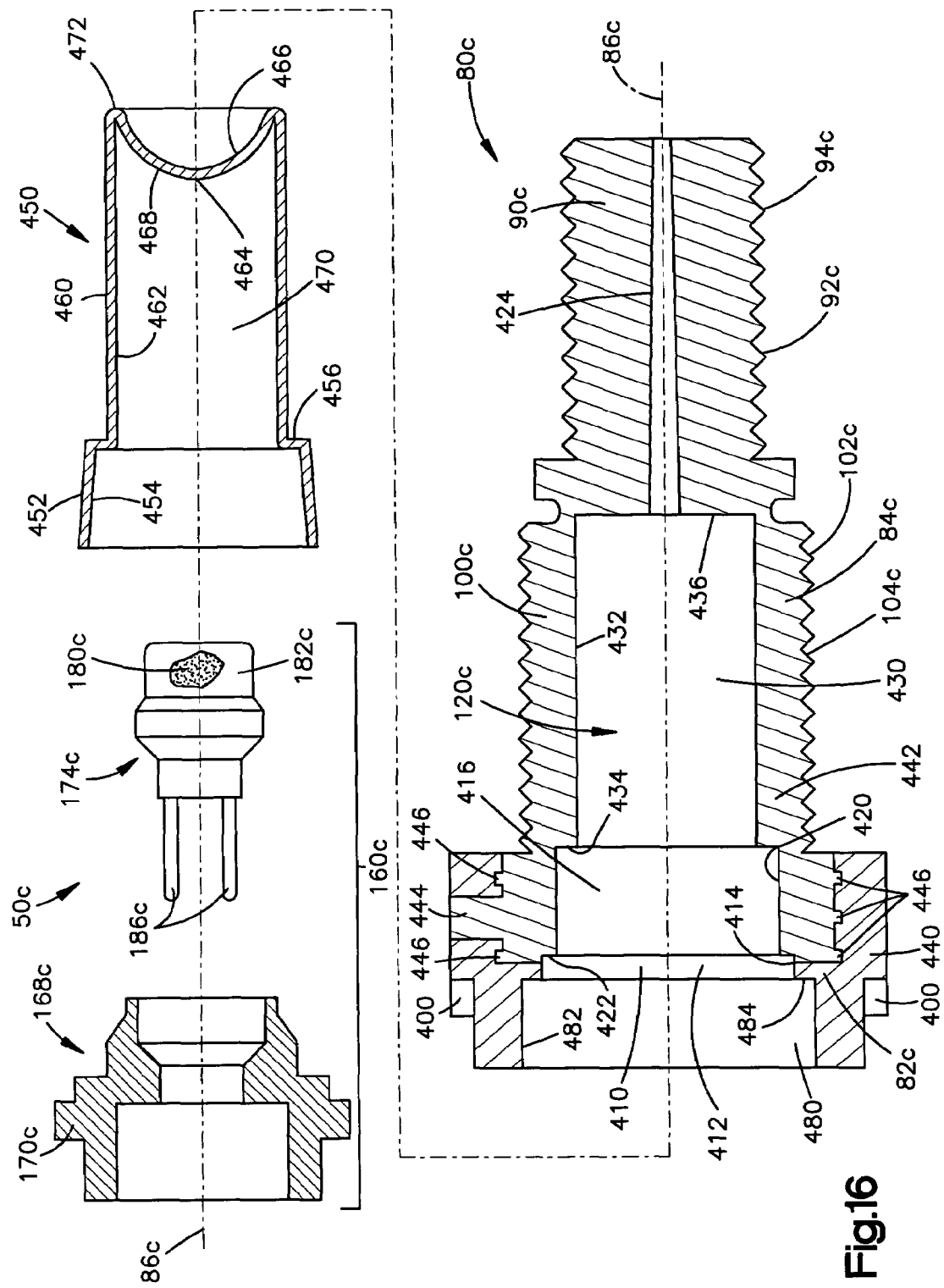
FIG. 16 is an exploded sectional view of the actuatable fastener of FIG. 14.

Referring to FIG. 16, the body 80c of the actuatable fastener 50c includes an interior chamber 120c centered along the axis 86c. The chamber 120c includes a support portion 410 and a sleeve portion 430. The support portion 410 is positioned within the head 82c of the body 80c and extends coaxially with the head. The support portion 410 includes a first portion 412 defined by a cylindrical side wall 414, a second portion 416 defined by a cylindrical side wall 420, and a third portion 480 defined by a cylindrical side wall 482. The first portion 412 has a diameter that is larger than the diameter of the second portion 416. An annular first shoulder 422 extends between the side walls 414 and 420.

The sleeve portion 430 is defined by a cylindrical side wall 432 and extends from the support portion 410 into the second shank portion 100c. The sleeve portion 430 is positioned adjacent to, and has a diameter smaller than, the second portion 416 of the support portion 410. An annular second shoulder 434 extends between the side wall 432 and the side wall 420. The sleeve portion 430 terminates at an end wall 436 adjacent the first shank portion 90c.

The third portion 480 is located at a terminal end of the head 82c. As shown in FIG. 16, the side wall 482 of the third portion 480 has a diameter greater than the diameter of the side wall 414 of the first portion 412 of the support portion 410. An annular shoulder 484 is thus formed between the side wall 482 and the side wall 414.

A vent passage 424 extends along the axis 86c from the end wall 436 through the first shank portion 90c and provides fluid communication between the chamber 120c and the exterior of the actuatable fastener 50c. The vent passage 424 may have a tapered configuration, as shown in FIG. 16.

According to the fourth embodiment of the present invention, the body portion 80c has a two piece construction including a housing portion 440 and a molded portion 442. The housing portion 440 forms an outer portion of the head 82c of the actuatable fastener 50c and is constructed of a high strength material, such as steel. The molded portion 442 forms an inner portion of the head 82c as well as the shank portion 84c of the actuatable fastener 50c. The molded portion 442 is constructed of a molded material, such as plastic, and is molded into the housing 440 in a known manner, such as insert molding.

The housing portion 440 includes means 444 for helping to prevent the molded portion 442 from rotating relative to the housing portion about the axis 86c. In the embodiment illustrated in FIGS. 14–17, the means 444 comprises an aperture extending through the housing portion 440. The housing portion 440 may include several of these apertures. The material of the molded portion 442, when molded into the housing portion 440 fills the aperture and hardens to prevent the unwanted rotational movement. The means 444 could have an alternative configuration, such as a recess in the housing portion 440 or ribs in the housing portion that extend parallel to the axis 86c.

The housing portion 440 also includes means 446 for helping to prevent the molded portion 442 from sliding or otherwise moving relative to the housing portion in a direction parallel to the axis 86c. In the embodiment illustrated in FIGS. 14–17, the means 446 comprises a series of grooves in the housing portion 440 that extend transverse to the axis 86c. The housing portion 440 may include means 446 in the form of several of these grooves. The material of the molded portion 442, when molded into the housing portion 440 fills the grooves and hardens to prevent the unwanted axial movement. The means 446 could have an alternative configuration, such as an aperture in the housing portion 440. To this end, the means 444 may also help prevent the unwanted relative axial movement between the molded portion 442 and the housing portion 440.

In one particular construction of the actuatable fastener 50c according to the fourth embodiment of the invention, the housing portion 440 is constructed of a high strength steel material, such as a low carbons steel or stainless steel. In this construction, the molded portion 442 is constructed of a polyamide Nylon® 6/6 material that is glass fiber reinforced and heat stabilized. An example of such a material is manufactured by the Bydyne Corporation and is marketed as Bydyne® R543H9166 Polyamide material. This material provides high tensile strength and low ultimate elongation qualities that are desirable for the construction of the actuatable fastener 50c. The high tensile strength is desirable to provide strong fastening capabilities. The low ultimate elongation helps ensure quick and reliable separation upon actuation of the fastener 50c. As another advantage, this material maintains its high tensile strength and low ultimate elongation throughout a wide range of temperatures. In an automotive implementation, such as that described in FIGS. 1–3, this temperature range may be about −40° C. to 90° C.

As a further advantage, the molded construction of the housing portion 440 allows the first shank portion 90c and/or the second shank portion 100c to be formed as connector types other than threaded. For example, the shank portions 90c and 100c may be formed as a snap-in connector (not shown) or a slide-in, friction fit connector, such as that depicted in the embodiment of FIGS. 10–13.

The actuatable fastener 50c also includes a member 450 having a generally hollow cylindrical or cup-shaped configuration. The member 450 includes a head portion 452 defined by a cylindrical side wall 454 and a punch portion 460 defined by a cylindrical side wall 462. The head portion 452 and the punch portion 454 are coaxial with each other and are centered along the axis 86c when the actuatable fastener 50 is in the assembled condition (see FIG. 15). The head portion 452 has a diameter that is greater than the diameter of the punch portion 454. An annular shoulder 456 extends between the side wall 454 of the head portion 452 and the side wall 462 of the punch portion 460.

The member 450 is formed of a metal, such as 304L stainless steel, 305 stainless steel, or 1008 low-carbon steel. These metals are corrosion resistant and have high tensile strength and ultimate elongation properties. The member 450 is thus both strong and fracture resistant. Those skilled in the art, however, will appreciate that the member 450 could be constructed of alternative materials.

The punch portion 460 terminates at a domed end wall 464 that closes the punch portion at an end of the punch portion opposite the head portion 452. The head portion 452, punch portion 460, and end wall 464 help define a chamber 470 of the member 450. The chamber 470 has an open end at the head portion 450 and an opposite end closed by the end wall 464. An annular rim 472 is formed at the intersection of the side wall 462 and the end wall 464. The rim 472 forms a terminal end of the punch portion 460 and the member 450.

The domed end wall 464 has a first surface 466 and an opposite second surface 468. In the non-actuated condition of the actuatable fastener 50c (FIG. 15), the first surface 466 faces concavely toward the end wall 436 of the sleeve portion 430 and the second surface 468 faces convexly toward the chamber 470 of the member 450.

The actuatable fastener 50c (FIG. 16) also includes an initiator 160c, including a support 170c and a squib 174c. The initiator 160c is identical to the initiator of the first embodiment of FIGS. 4–8 and therefore will not be described in detail in regard to the fourth embodiment of FIGS. 14–17.

Figure 15:
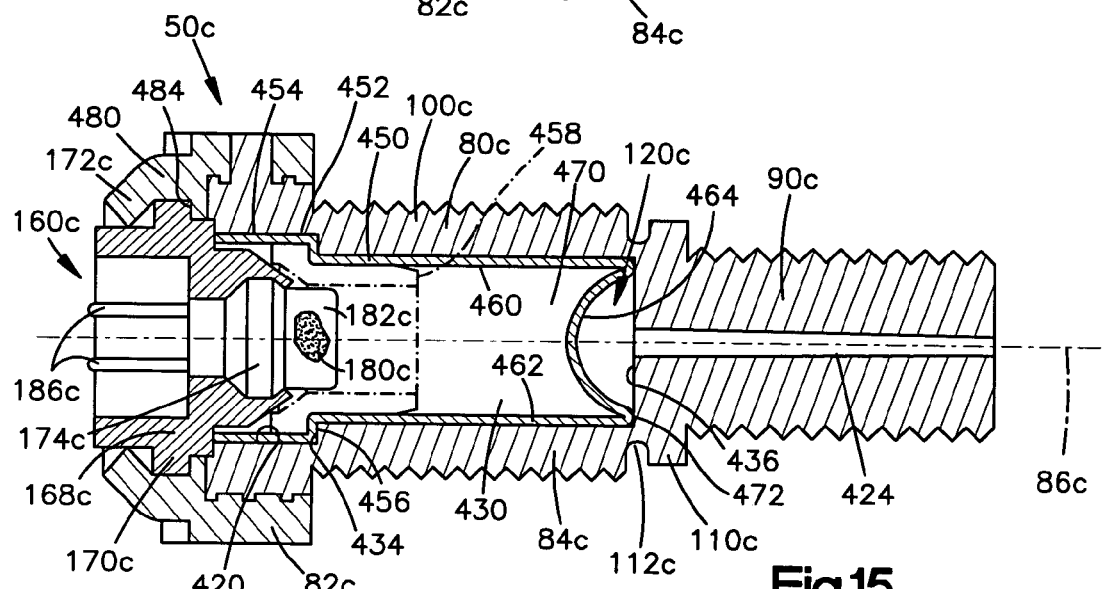
FIG. 15 is a sectional view of the actuatable fastener of FIG. 14 illustrating the fastener in an assembled and unactuated condition.

Referring to FIG. 15, in an assembled condition of the actuatable fastener 50c, the member 450 is seated in the chamber 120c such that the shoulder 456 of the member is positioned against the shoulder 434 in the chamber. As best shown in FIG. 16, the side wall 454 of the head portion 452 may extend at a slight angle radially outward from the shoulder 456. The side wall 454 (FIG. 15) of the head portion 452 may create an interference fit with the side wall 420.

The punch portion 460 extends into the sleeve portion 430 such that the rim 472 at the terminal end of the punch portion is positioned close to, but slightly spaced from, the end wall 436 at the end of the sleeve. For example, the rim 472 may be spaced about 0.2–0.5 millimeters from the end wall 436. The interference fit between the head portion 452 and the side wall 420 helps maintain this close positioning between the rim 472 and the end wall 436.

When the actuatable fastener 50c is in the assembled condition of FIG. 15, the annular flange 170c on the support 168c of the initiator 160c is seated against the annular shoulder 484 in the chamber 120c. The initiator 160c extends from the third portion 480 into the sleeve portion 430 of the chamber 120c and into the chamber 470 of the member 450. An annular terminal end portion 172c of the head 82c is crimped over the flange 170c to secure the initiator 160c in the third portion 480. Those skilled in the art, however, will appreciate that the initiator 160c could be secured to the head 82c in an alternative manner. For example, the initiator 160c could be secured to the head 82c by screw threads.

The actuatable fastener 50c of the fourth embodiment is assembled to the air bag module 12 (FIGS. 1–3) in a manner identical to that described in the first embodiment and illustrated in FIGS. 6–8. Thus, the actuatable fastener 50c of the fourth embodiment may be used to actuate a vent or release a tether in a manner similar or identical to that described above in regard to the first embodiment.

Upon actuation of the initiator 160c, an electric current flows through the initiator terminals 186c into the squib 174c and ignites the body of pyrotechnic material 180c in the squib. The pyrotechnic material 180, when ignited, produces combustion products, including heat, particles, and a luminous flash. Ignition of the pyrotechnic material 180 ruptures the end cap 182c, which releases the combustion products into the chamber 470 formed by the member 450. Heat released during ignition of the pyrotechnic material 180c heats air in the chamber 470, which causes the air to expand. The expanding air pressurizes the chamber 470 and acts on the punch portion 460, which urges the member 450 to deform or elongate in a direction parallel to the axis 86c toward the end wall 436. The actuatable fastener 50c is thus actuated from the non-actuated condition of FIG. 15 to the actuated condition of FIG. 17.

Figure 17:
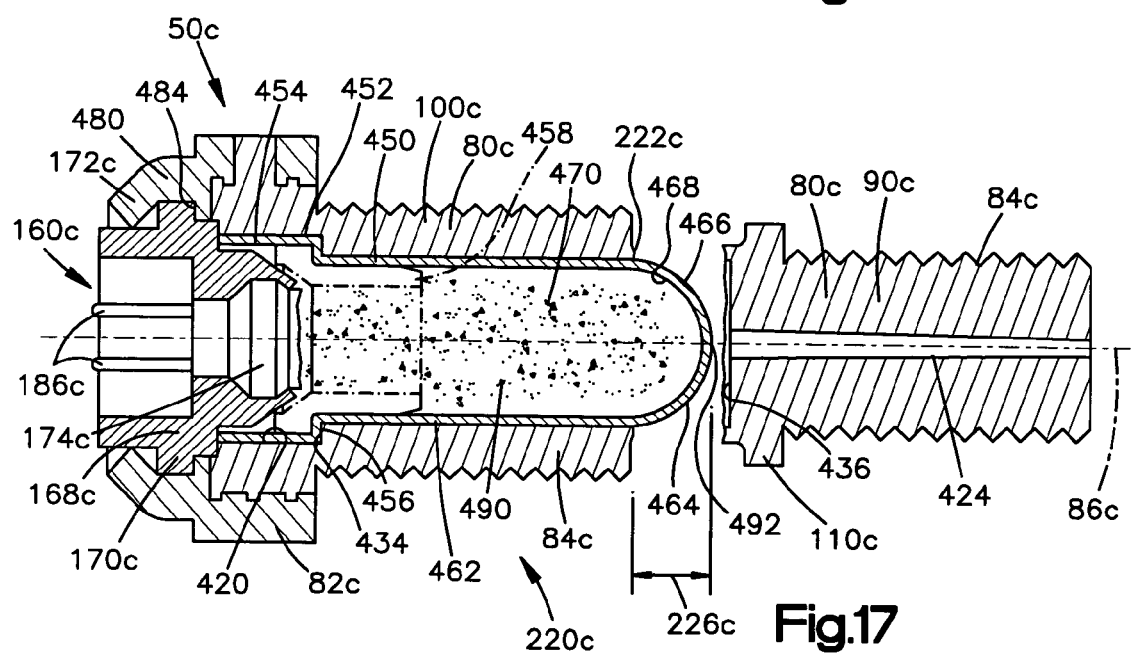
FIG. 17 is a sectional view of the actuatable fastener of FIG. 14 illustrating the fastener in an actuated condition.

Referring to FIG. 17, when the actuatable fastener 50c is actuated, the first shank portion 90c is separated from the second shank portion 100c when the rim 472 (see FIG. 15) strikes the end wall 436. The fracture or rupture between the first and second shank portions 90c and 100c occurs quickly. For example, the first and second shank portions 90c and 100c may become separated in 1–2 milliseconds, or less. This separation time is due to a variety of factors. In the non-actuated condition (FIG. 15), the rim 472 is positioned close (e.g., 0.2–0.5 millimeters) to the end wall 436, so the rim strikes the end wall quickly upon actuation of the initiator 160c. Also, the chamber 470 of the member 450, being sealed in the chamber 120c of the body 80c, pressurizes quickly when the initiator 160c is actuated, which causes the member 450 to respond, i.e., deform, quickly. Further, the vent passage 424, being positioned outside the member 450 and providing fluid communication with the exterior of the fastener 50c, helps relieve pressurization in the chamber 120c outside the member 450, which helps reduce resistance to elongation or movement of the member 450 along the axis 86c.

The actuatable fastener 50c (FIG. 17) is also configured to help block the combustion products from escaping the chamber 120c when the initiator 160c is actuated. The interference fit between the side wall 454 of the member 450 and the side wall 420 helps block the combustion products, indicated at 490, from escaping the chamber 470. The tight fit between the flange 170c and the shoulder 484 also helps block escape of the combustion products. The fit between the support portion 168c of the initiator 160c and the side wall 454 of the member 450 may further help block escape of the combustion products.

According to the present invention, the actuatable fastener 50c (FIGS. 14–17) of the fourth embodiment is constructed such that the member 450 propels the first shank portion 90c, when ruptured and separated from the second shank portion 100c, a minimum distance from the remainder of the actuatable fastener.

Referring to FIG. 17, when the actuatable fastener 50c is actuated, a rupture or fracture 222c is produced in the shank 84c at the annular groove 112c, separating the first shank portion 90c from the remainder of the actuatable fastener 50c. The remainder of the fastener, indicated at 220c, thus has a terminal end at the location of the rupture or fracture 222c. According to the fourth embodiment of the present invention, the domed end wall 464 of the member 450 is reversed due to the pressure in the chamber 470 when the initiator 160c is actuated. As a result, the domed end wall 464 extends convexly outward from the terminal end of the remainder 220c of the actuatable fastener 50c. The first surface 466 thus faces convexly away from the remainder 220c of the actuatable fastener 50c and the second surface 468 faces concavely toward the chamber 470 of the member 450. When the actuatable fastener 50c is actuated, the domed end wall 464 of the member 450 extends beyond the terminal end 222c of the remainder 220c a distance, referred to herein as a minimum displacement. This minimum displacement, indicated at 226c, is measured between an apex 492 of the domed end wall 464 and the terminal end surface of the remainder 220c of the actuatable fastener 50c (i.e., the fracture 222).

It will be appreciated that the actuatable fastener 50c may be configured to produce a desired minimum displacement 226 between the first and second shank portions 90c and 100c when the fastener is actuated. This is accomplished by configuring the fastener 50c such that the domed end wall 464 of the member 450 moves a desired minimum distance beyond the terminal end surface 222c of the remainder 220c of the fastener 50c. For example, if a minimum displacement 226 of three millimeters (3.0 mm) is desired, the actuatable fastener 50c is configured such that the apex 492 of the domed end wall 464 of the member 450 extends three millimeters beyond the terminal end surface 222c of the remainder 220c of the fastener when the fastener is actuated.

Referring to FIGS. 15 and 17, the actuatable fastener 50c may include an insert 458, positioned within the chamber 470 of the member 450, for helping to facilitate elongation of the member and reversal of the domed end wall 464. The insert 458 may be formed of any suitable material, such as the molded material used to form the molded portion 442 of the actuatable fastener 50c.

The insert 458 has a first generally cylindrical portion that is press fitted with the member 450 using an interference fit which prevents rattling or unwanted movement of the insert relative to the member. The insert 458 has a second cylindrical portion, having a diameter smaller than the first cylindrical portion, that extends into the chamber 470 of the member 450. The first and second cylindrical portions of the insert 458 at least partially encircle the initiator 160c.

Upon actuation of the initiator 160c, combustion products produced through ignition of the pyrotechnic material of the initiator cause the member 450 to elongate and fracture the first shank portion 90c from the second shank portion 10c, as described above. After separation of the first and second shank portions 90c and 100c, the dome-shaped end wall 464 reverses, thus moving the end wall beyond the minimum displacement.

The member 450 has an outside diameter that may be selected to achieve a specific contact area required to fracture the first shank portion 90c from the second shank portion 100c with a predetermined amount of force. The insert 458 reduces the void volume in the chamber 470. Because of the reduced volume in the chamber 470, pressure in the chamber may increase more rapidly upon actuation of the initiator 160c. This, in turn, may help provide a reduction in the time that elapses between actuation of the initiator 160c and separation of the actuatable fastener 50c. The reduced volume of the chamber 470 may also help reduce the size of the initiator 160c or the amount of pyrotechnic material 180c required to cause separation. The insert 458 may thus be used to help adjust or tailor the force achieved through actuation of the initiator 160c such that the force is sufficient to cause the member 450, having a given geometry, to fracture the first shank portion 90c from the second shank portion 100c.

The construction of the actuatable fastener 50c of the fourth embodiment provides advantages in addition to those described above. The close fit between the member 450, the body portion 80c, and the initiator 160c helps prevent the components of the actuatable fastener 50c from rattling against each other, thus helping to reduce undesirable noise. The plastic construction of the molded portion 442 of the body portion 80c reduces the overall weight of the actuatable fastener 50c. The plastic construction also eliminates machining operations that would be required to construct the body portion 80c entirely from metal, which may help reduce the cost of producing the fastener 50c.

The member 450 helps prevent fracturing of the molded portion 442 upon actuation of the actuatable fastener 50c. The member 450, being constructed of a high strength fracture-resistant metal, resists radial expansion when the initiator 160c is actuated. The member 450 thus helps lower the combustion forces from acting radially on the molded portion 442, which helps prevent unwanted fracturing of the molded portion.

The plastic construction of the molded portion 442 also provides a significant safety feature in the event of a fire or other situation where the actuatable fastener 50c may be exposed to extreme heat. In this situation, the molded portion 442 might melt prior to the squib 174c reaching a temperature sufficient to cause ignition of the pyrotechnic material 180c. In such a case, the structure of the body portion 80c would likely be heated to a molten condition prior to the unwanted firing of the squib 174c. As a result, the fracture of portions of the molded portion would be unlikely when the squib fires because the elastic quality of the molten plastic would tend to help absorb the shock.

From the above description of the invention, those skilled in the art will perceive improvements, changes and modifications in the invention. Such improvements, changes and modifications within the skill of the art are intended to be covered by the appended claims.

Having described the invention, we claim:

1. An actuatable fastener comprising:
    a body including a head and a shank, said body including an interior chamber partially defined by a side wall extending from said head into said shank and an end wall positioned in said shank;
    a member disposed in said chamber; and
    an initiator actuatable to produce combustion products in said chamber that act on said member to move said member in a first direction in said chamber to strike said end wall, said member having portions that deform prior to striking said end wall when said member moves in said first direction, said member striking said end wall creating a fracture in said shank separating at least a portion of said shank from a remainder of said shank, said combustion products moving said member beyond said fracture at least a predetermined distance to move said at least a portion of said shank at least said predetermined distance from said remainder of said shank, wherein the member does not contact said end wall of said shank before said initiator is actuated.

2. The actuatable fastener recited in claim 1, wherein said shank includes a first shank portion opposite said head and a second shank portion positioned between said first shank portion and said head, said first shank portion being separated from said second shank portion when said shank is ruptured.

3. The actuatable fastener recited in claim 2, wherein said shank includes an annular groove separating said first shank portion from said second shank portion, said fracture occurring at said annular groove.

4. The actuatable fastener recited in claim 2, wherein said chamber comprises a sleeve portion having a first end located in said head and an opposite second end located in said shank, said sleeve portion being at least partially defined by a side wall extending from said first end of said sleeve portion to said second end of said sleeve portion, said side wall defining said sleeve portion having a first diameter at said first end of said of said sleeve portion and tapering to a second diameter smaller than said first diameter at said second end of said sleeve portion.

5. The actuatable fastener recited in claim 4, wherein said chamber further comprises a cylinder portion and said member includes a portion comprising a piston and a portion comprising a punch, said piston being disposed in and movable along said cylinder portion, said punch being disposed in and movable along said sleeve portion.

6. The actuatable fastener recited in claim 5, further comprising at least one annular ring projecting from and extending around an annular outer surface of said piston, said at least one ring engaging a side wall that at least partially defines said cylinder portion and providing a seal for helping to block said combustion products from escaping said chamber when said initiator is actuated.

7. The actuatable fastener recited in claim 6, wherein said at least one ring frictionally engages said side wall defining said cylinder portion, said at least one ring being deformable upon movement of said member in said chamber.

8. The actuatable fastener recited in claim 5, further comprising a spring for biasing said member against movement in said chamber prior to actuation of said initiator, said spring being deflectable by said member upon actuation of said initiator to permit movement of said member in said chamber.

9. The actuatable fastener recited in claim 2, wherein said shank further comprises a terminal shoulder portion, said first and second shank portions being positioned between said head and said terminal shoulder portion, said first and second shank portions each having a diameter smaller than said head and said shoulder portion.

10. The actuatable fastener recited in claim 9, wherein said first and second shank portions are insertable into respective slots of first and second structures to releasably connect said first and second structures, said slots having widths greater than the diameters of said first and second shank portions and smaller than the diameters of said head and said shoulder portion.

11. The actuatable fastener recited in claim 10, wherein said first and second structures are biased away from each other which causes a frictional engagement between said shoulder portion and said first structure and between said head and said second structure, said frictional engagement helping to connect said actuatable fastener to said first and second structures.

12. The actuatable fastener recited in claim 1, wherein said chamber has a cylindrical configuration and said member has a cylindrical side wall positioned in said chamber with a first end portion proximate said initiator and an opposite second end portion proximate said end wall of said chamber, said second end portion having a terminal end comprising an annular rim.

13. The actuatable fastener recited in claim 1, wherein said member has an interference fit with said side wall that forms a seal to block said combustion products from escaping said chamber.

14. The actuatable fastener recited in claim 1, wherein said combustion products comprise at least one of solids and luminous ignition flashes.

15. The actuatable fastener recited in claim 1, wherein said initiator is at least partially supported in said head.

16. The actuatable fastener recited in claim 1, wherein said body comprises a metal housing and a plastic portion molded onto said housing, said metal housing forming a portion of said head, said plastic portion forming said shank and a portion of said head.

17. The actuatable fastener recited in claim 1, wherein said shank has a first portion connectable with a first part and a second portion connectable with a second part, the first part being movable relative to the second part, said first portion of said shank being separated from said second portion of said shank when said member causes said fracture in said shank, said member moving said first portion of said shank and said first part at least said predetermined distance from said second portion of said shank and said second part.

18. An actuatable fastener comprising:
a body including a head and a shank, said body including an interior chamber partially defined by a side wall extending from said head into said shank and an end wall positioned in said shank;
a member disposed in said chamber; and
an initiator actuatable to produce combustion products in said chamber that act on said member to move said member in a first direction in said chamber to strike said end wall, said member striking said end wall creating a fracture in said shank separating at least a portion of said shank from a remainder of said shank, said combustion products moving said member beyond said fracture at least a predetermined distance to move said at least a portion of said shank at least said predetermined distance from said remainder of said shank, wherein the member does not contact said end wall of said shank before said initiator is actuated, said shank including a first shank portion opposite said head and a second shank portion positioned between said first shank portion and said head, said first shank portion being separated from said second shank portion when said shank is ruptured, wherein said first shank portion has an outer surface comprising first screw threads and said second shank portion has an outer surface comprising second screw threads.

19. The actuatable fastener recited in claim 18, wherein one of said first and second screw threads comprise right hand threads and the other of said first and second screw threads comprise left hand threads.

20. The actuatable fastener recited in claim 18, further comprising a first fastener that cooperates with said first screw threads to fixedly connect said first shank portion to a first part, and a second fastener that cooperates with said second screw threads to fixedly connect said second shank portion to a second part, said first and second parts thereby being releasably connected to each other.

21. An actuatable fastener comprising:
a body including a head and a shank, said body including an interior chamber partially defined by a side wall extending from said head into said shank and an end wall positioned in said shank;
a member disposed in said chamber; and
an initiator actuatable to produce combustion products in said chamber that act on said member to move said member in a first direction in said chamber to strike said end wall, said member striking said end wall creating a fracture in said shank separating at least a portion of said shank from a remainder of said shank, said combustion products moving said member beyond said fracture at least a predetermined distance to move said at least a portion of said shank at least said predetermined distance from said remainder of said shank, wherein said chamber has a cylindrical configuration and said member has a cylindrical side wall positioned in said chamber with an open first end portion proximate said initiator and an opposite closed second end portion proximate said end wall of said chamber, said second end portion including a domed end wall having a first surface presented concavely toward said end wall of said chamber and an opposite second surface presented convexly toward said initiator, said second end portion having a terminal end comprising an annular rim defined at an intersection of said side wall of said member and said domed end wall.

22. The actuatable fastener recited in claim 21, wherein said annular rim strikes said end wall of said chamber to create said fracture upon actuation of said initiator, said combustion products thereafter acting on said domed end wall and reversing said domed end wall such that said second surface is presented concavely toward said initiator and said first surface protrudes convexly at least said predetermined distance beyond said fracture.

23. Apparatus comprising:
an inflatable vehicle occupant protection device for helping to protect a vehicle occupant, said inflatable vehicle occupant protection device having a deflated condition and an inflated condition;
an inflation fluid source actuatable to provide inflation fluid to inflate said protection device from the deflated condition to the inflated condition;
a housing for helping to direct inflation fluid from said inflation fluid source toward said protection device upon actuation of said inflation fluid source;
a vent opening in said housing for venting inflation fluid from said housing;
a vent member movable a predetermined distance from a closed position blocking venting of inflation fluid through said vent opening to an open position enabling venting of inflation fluid through said vent opening;
an actuatable fastener comprising a body having a shank with a first portion connectable with said vent member and a second portion connectable with said housing to hold said vent member in said closed position, said body of said actuatable fastener further comprising a head, said body including an interior chamber partially defined by a side wall extending from said head into said shank and an end wall positioned in said shank, said second portion being located closer to said head than said first portion;
a member disposed in said chamber;
an initiator actuatable to produce combustion products in said chamber that act on said member to move said member in a first direction in said chamber to strike said end wall, said member striking said end wall creating a fracture in said shank separating said first portion of said shank from said second portion of said shank and release said vent member for movement toward said open position, said combustion products moving said member beyond said fracture at least a predetermined distance to move said first portion of said shank at least said predetermined distance from said second portion to propel said vent member from said closed position to said open position, wherein said first portion is moveable with said vent member.

24. Apparatus comprising:
an inflatable vehicle occupant protection device for helping to protect a vehicle occupant, said inflatable vehicle occupant protection device having a deflated condition and an inflated condition;
an inflation fluid source actuatable to provide inflation fluid to inflate said protection device from the deflated condition to the inflated condition;
a housing for helping to direct inflation fluid from said inflation fluid source toward said protection device upon actuation of said inflation fluid source;
an actuatable fastener connected to said housing, said actuatable fastener comprising:
a body including a head and a shank, said body including an interior chamber partially defined by a side wall extending from said head into said shank and an end wall positioned in said shank;
a member disposed in said chamber; and
an initiator actuatable to produce combustion products in said chamber that act on said member to move said member in a first direction in said chamber to strike said end wall, said member striking said end wall creating a fracture in said shank separating at least a portion of said shank from a remainder of said shank, said combustion products moving said member beyond said fracture at least a predetermined distance to move said at least a portion of said shank at least said predetermined distance from said remainder of said shank, wherein said portion of said shank is moveable with a said vent member.

25. The apparatus recited in claim 24, wherein said member does not contact said end wall of said shank before said initiator is actuated.

26. Apparatus comprising:
an inflatable vehicle occupant protection device for helping to protect a vehicle occupant, said inflatable vehicle occupant protection device having a deflated condition and an inflated condition;
an inflation fluid source actuatable to provide inflation fluid to inflate said protection device from the deflated condition to the inflated condition;
a housing for helping to direct inflation fluid from said inflation fluid source toward said protection device upon actuation of said inflation fluid source;
a tether for restricting deployment of said inflatable occupant protection device, said tether having a first end fixed to said inflatable vehicle occupant protection device for movement with the inflatable vehicle occupant protection device and a second end fixed to said housing, a first actuatable fastener having a shank with a first portion connectable with said tether at a location between said first and second end and a second portion connectable with said housing to restrict movement of said inflatable vehicle occupant protection device with respect to said location, said first actuatable fastener being actuatable to fracture said shank and release said tether for movement with the inflatable vehicle occupant protection device to restrict movement of said inflatable occupant protection device with respect to said second end; and
a second actuatable fastener for releasing a vent member and allowing inflation fluid to flow away from said inflatable vehicle occupant protection device.

27. The apparatus recited in claim 26 including a vent opening in said housing for venting inflation fluid from said housing, said vent member being movable a predetermined distance from a closed position blocking venting of inflation fluid through said vent opening to an open position enabling venting of inflation fluid through said vent opening, said second actuatable fastener having a shank with a first portion connectable with said vent member and a second portion connectable with said housing to hold said vent member in said closed position, said second actuatable fastener being actuatable to fracture said shank and release said vent member for movement toward said open position, said second actuatable fastener further comprising means for displacing said first portion the predetermined distance from said second portion to propel said vent member the predetermined distance from said closed position to said open position.

28. Apparatus comprising:
an inflatable vehicle occupant protection device for helping to protect a vehicle occupant, said inflatable vehicle occupant protection device having a deflated condition and an inflated condition;
an inflation fluid source actuatable to provide inflation fluid to inflate said protection device from the deflated condition to the inflated condition;

a housing for helping to direct inflation fluid from said inflation fluid source toward said protection device upon actuation of said inflation fluid source;

a vent opening in said housing for venting inflation fluid from said housing;

a vent member having an aperture, said vent member movable a predetermined distance from a closed position blocking venting of inflation fluid through said vent opening to an open position in which said aperture is in fluid communication with said vent opening to enable venting of inflation fluid through said vent opening; and an actuatable fastener having a shank with a first portion connectable with said vent member and a second portion connectable with said housing to hold said vent member in said closed position, said actuatable fastener being actuatable to fracture said shank and release said vent member for movement toward said open position, said actuatable fastener further comprising means for displacing said first portion the predetermined distance from said second portion to propel said vent member the predetermined distance from said closed position to said open position.

\* \* \* \* \*